United States Patent
Volini et al.

(10) Patent No.: US 9,912,653 B2
(45) Date of Patent: *Mar. 6, 2018

(54) CONTROLLED TOKEN DISTRIBUTION TO PROTECT AGAINST MALICIOUS DATA AND RESOURCE ACCESS

(71) Applicant: Live Nation Entertainment, Inc., Beverly Hills, CA (US)

(72) Inventors: Phillip Volini, Beverly Hills, CA (US); John Raymond Werneke, Naperville, IL (US); Carl Schumaler, Beverly Hills, CA (US); Michael Smith, Palentine, IL (US); Frank Giannantonio, Verona, WI (US); Vito Iaia, Santa Monica, CA (US); Sean Moriarty, Pasadena, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,265

(22) Filed: Dec. 23, 2016

(65) Prior Publication Data

US 2017/0111350 A1    Apr. 20, 2017

Related U.S. Application Data

(60) Continuation-in-part of application No. 14/973,205, filed on Dec. 17, 2015, now Pat. No. 9,807,096, and a continuation-in-part of application No. 12/435,972, filed on May 5, 2009, now abandoned, and a continuation-in-part of application No. 14/617,765, filed on Feb. 9, 2015, which is a continuation of (Continued)

(51) Int. Cl.
*H04L 29/06* (2006.01)

(52) U.S. Cl.
CPC .......... *H04L 63/0807* (2013.01); *H04L 63/08* (2013.01); *H04L 63/10* (2013.01)

(58) Field of Classification Search
USPC ................................................ 713/159, 158
See application file for complete search history.

(56) References Cited

U.S. PATENT DOCUMENTS 3,581,072 A    5/1971  Nymeyer
3,622,995 A    11/1971 Dilks
(Continued)

FOREIGN PATENT DOCUMENTS

AU   2000229843   8/2006
AU   2006203419   1/2008
(Continued)

OTHER PUBLICATIONS

U.S. Appl. No. 10/731,410, filed Dec. 9, 2003, Denker et al.
(Continued)

*Primary Examiner* — Amare F Tabor
(74) *Attorney, Agent, or Firm* — Kilpatrick Townsend & Stockton, LLP

(57) ABSTRACT

Techniques are described for controlling data and resource access. For example, methods and systems can facilitate controlled token distribution across systems and token processing in a manner so as to limit access to and to protect data that includes access codes.

20 Claims, 15 Drawing Sheets

Related U.S. Application Data application No. 14/289,010, filed on May 28, 2014, now Pat. No. 9,491,230, which is a continuation of application No. 13/606,934, filed on Sep. 7, 2012, now Pat. No. 8,775,519, which is a division of application No. 13/358,469, filed on Jan. 25, 2012, now Pat. No. 8,266,211, which is a division of application No. 12/204,648, filed on Sep. 4, 2008, now Pat. No. 8,126,991.

(60) Provisional application No. 62/093,828, filed on Dec. 18, 2014, provisional application No. 61/050,543, filed on May 5, 2008, provisional application No. 60/969,884, filed on Sep. 4, 2007.

(56) References Cited

U.S. PATENT DOCUMENTS

| | | | |
|---|---|---|---|
| 4,412,287 | A | 10/1983 | Braddock, III |
| 4,603,232 | A | 7/1986 | Kurland et al. |
| 4,788,643 | A | 11/1988 | Trippe et al. |
| 4,789,928 | A | 12/1988 | Fujisaki |
| 4,799,156 | A | 1/1989 | Shavit et al. |
| 4,816,904 | A | 3/1989 | McKenna et al. |
| 4,845,739 | A | 7/1989 | Katz |
| 4,862,357 | A | 8/1989 | Ahlstrom et al. |
| 4,889,280 | A | 12/1989 | Gradl et al. |
| 4,980,826 | A | 12/1990 | Wagner |
| 5,077,665 | A | 12/1991 | Silverman et al. |
| 5,095,196 | A | 3/1992 | Miyata |
| 5,101,353 | A | 3/1992 | Lupien et al. |
| 5,112,050 | A | 5/1992 | Koza et al. |
| 5,136,501 | A | 8/1992 | Silverman et al. |
| 5,181,786 | A | 1/1993 | Hujink |
| 5,237,499 | A | 8/1993 | Garback |
| 5,239,480 | A | 8/1993 | Huegel |
| 5,253,165 | A | 10/1993 | Leiseca et al. |
| 5,265,916 | A | 11/1993 | Coe |
| 5,283,734 | A | 2/1994 | Van Kohorn |
| 5,311,425 | A | 5/1994 | Inada |
| 5,329,589 | A | 7/1994 | Fraser et al. |
| 5,333,257 | A | 7/1994 | Merrill et al. |
| 5,347,306 | A | 9/1994 | Nitta |
| 5,408,417 | A | 4/1995 | Wilder |
| 5,422,809 | A | 6/1995 | Griffin et al. |
| 5,426,281 | A | 6/1995 | Abecassis |
| 5,428,778 | A | 6/1995 | Brookes |
| 5,475,585 | A | 12/1995 | Bush |
| 5,489,096 | A | 2/1996 | Aron |
| 5,496,991 | A | 3/1996 | Delfer et al. |
| 5,518,239 | A | 5/1996 | Johnston |
| 5,537,684 | A | 7/1996 | Cassidy et al. |
| 5,553,145 | A | 9/1996 | Micali |
| 5,557,518 | A | 9/1996 | Rosen |
| 5,559,707 | A | 9/1996 | Delorme et al. |
| 5,581,461 | A | 12/1996 | Coll et al. |
| 5,592,375 | A | 1/1997 | Salmon et al. |
| 5,598,477 | A | 1/1997 | Berson |
| 5,634,101 | A | 5/1997 | Blau |
| 5,664,115 | A | 9/1997 | Fraser |
| 5,684,801 | A | 11/1997 | Amitay et al. |
| 5,724,520 | A | 3/1998 | Goheen |
| 5,742,763 | A | 4/1998 | Jones |
| 5,754,654 | A | 5/1998 | Hiroya et al. |
| 5,757,917 | A | 5/1998 | Rose et al. |
| 5,774,873 | A | 6/1998 | Berent et al. |
| 5,794,207 | A | 8/1998 | Walker et al. |
| 5,794,210 | A | 8/1998 | Goldhaber et al. |
| 5,794,219 | A | 8/1998 | Brown |
| 5,797,126 | A | 8/1998 | Helbing et al. |
| 5,797,127 | A | 8/1998 | Walker et al. |
| 5,812,670 | A | 9/1998 | Micali |
| 5,818,914 | A | 10/1998 | Fujisaki |
| 5,826,241 | A | 10/1998 | Stein et al. |
| 5,832,454 | A | 11/1998 | Jafri et al. |
| 5,835,896 | A | 11/1998 | Fisher et al. |
| 5,845,265 | A | 12/1998 | Woolston |
| 5,845,266 | A | 12/1998 | Lupien et al. |
| 5,850,442 | A | 12/1998 | Muftic |
| 5,890,138 | A | 3/1999 | Godin et al. |
| 5,918,209 | A | 6/1999 | Campbell et al. |
| 5,930,761 | A | 7/1999 | O'Toole |
| 6,023,685 | A | 2/2000 | Brett et al. |
| 6,023,686 | A | 2/2000 | Brown |
| 6,026,383 | A | 2/2000 | Ausubel |
| 6,038,537 | A | 3/2000 | Matsuoka |
| 6,044,363 | A | 3/2000 | Mori et al. |
| 6,047,264 | A | 4/2000 | Fisher et al. |
| 6,048,271 | A | 4/2000 | Barcelou |
| 6,067,532 | A | 5/2000 | Gebb |
| 6,070,146 | A | 5/2000 | Mimata |
| 6,082,620 | A | 7/2000 | Bone, Jr. |
| 6,085,164 | A | 7/2000 | Smith et al. |
| 6,085,169 | A | 7/2000 | Walker et al. |
| 6,085,976 | A | 7/2000 | Sehr |
| 6,094,640 | A | 7/2000 | Goheen |
| 6,107,932 | A | 7/2000 | Goheen |
| 6,119,096 | A | 9/2000 | Mann et al. |
| 6,119,945 | A | 9/2000 | Muller et al. |
| 6,175,922 | B1 | 1/2001 | Wang et al. |
| 6,192,349 | B1 | 2/2001 | Husemann et al. |
| 6,216,227 | B1 | 4/2001 | Goldstein et al. |
| 6,223,166 | B1 | 4/2001 | Kay |
| 6,230,146 | B1 | 5/2001 | Alaia et al. |
| 6,240,396 | B1 | 5/2001 | Walker et al. |
| 6,243,691 | B1 | 6/2001 | Fisher et al. |
| 6,246,996 | B1 | 6/2001 | Stein et al. |
| 6,263,315 | B1 | 7/2001 | Talluri |
| 6,308,159 | B1 | 10/2001 | Strohl |
| 6,313,833 | B1 | 11/2001 | Knight |
| 6,332,129 | B1 | 12/2001 | Walker et al. |
| 6,341,353 | B1 | 1/2002 | Herman et al. |
| 6,401,147 | B1 | 6/2002 | Sang et al. |
| 6,418,415 | B1 | 7/2002 | Walker et al. |
| 6,434,398 | B1 | 8/2002 | Inselberg |
| 6,442,165 | B1 | 8/2002 | Sitaraman et al. |
| 6,446,045 | B1 | 9/2002 | Stone et al. |
| 6,449,346 | B1 | 9/2002 | Katz |
| 6,466,917 | B1 | 10/2002 | Goyal et al. |
| 6,470,394 | B1 | 10/2002 | Bamforth et al. |
| 6,470,451 | B1 | 10/2002 | Weinstein |
| 6,477,503 | B1 | 11/2002 | Mankes |
| 6,484,153 | B1 | 11/2002 | Walker et al. |
| 6,496,809 | B1 | 12/2002 | Nakfoor |
| 6,523,037 | B1 | 2/2003 | Monahan et al. |
| 6,556,548 | B1 | 4/2003 | Kirkby et al. |
| 6,603,568 | B1 | 8/2003 | Sansone |
| 6,604,107 | B1 | 8/2003 | Wang |
| 6,606,661 | B1 | 8/2003 | Agrawal et al. |
| 6,658,390 | B1 | 12/2003 | Walker et al. |
| 6,662,230 | B1 | 12/2003 | Eichstaedt et al. |
| 6,679,421 | B2 | 1/2004 | Shin et al. |
| 6,685,093 | B2 | 2/2004 | Challa et al. |
| 6,690,794 | B1 | 2/2004 | Terao et al. |
| 6,704,489 | B1 | 3/2004 | Kurauchi et al. |
| 6,704,713 | B1 | 3/2004 | Brett |
| 6,736,322 | B2 | 5/2004 | Gobburu et al. |
| 6,782,535 | B1 | 8/2004 | Dai-Santo et al. |
| 6,819,759 | B1 | 11/2004 | Khuc et al. |
| 6,820,201 | B1 | 11/2004 | Lincoln et al. |
| 6,829,348 | B1 | 12/2004 | Schroeder et al. |
| 6,829,644 | B2 | 12/2004 | Aufderheide |
| 6,832,255 | B1 | 12/2004 | Rumsewicz et al. |
| 6,842,741 | B1 | 1/2005 | Fujimura |
| 6,845,361 | B1 | 1/2005 | Dowling |
| 6,847,969 | B1 | 1/2005 | Mathai et al. |
| 6,850,901 | B1 | 2/2005 | Hunter et al. |
| 6,853,642 | B1 | 2/2005 | Sitaraman et al. |
| 6,854,010 | B1 | 2/2005 | Christian et al. |
| 6,854,651 | B2 | 2/2005 | Smith et al. |
| 6,859,783 | B2 | 2/2005 | Cogger et al. |
| 6,873,969 | B2 | 3/2005 | Stone et al. |
| 6,876,974 | B1 | 4/2005 | Marsh et al. |
| 6,877,661 | B2 | 4/2005 | Webb et al. |

(56) References Cited

U.S. PATENT DOCUMENTS

| | | | |
|---|---|---|---|
| 6,877,665 B2 | 4/2005 | Challa et al. | |
| 6,898,472 B2 | 5/2005 | Crampton et al. | |
| 6,901,429 B2 | 5/2005 | Dowling | |
| 6,907,405 B2 | 6/2005 | Brett | |
| 6,910,019 B2 | 6/2005 | Dorr | |
| 6,910,627 B1 | 6/2005 | Simpson-Young et al. | |
| 6,920,428 B2 | 7/2005 | Greene | |
| 6,937,998 B1 | 8/2005 | Swartz et al. | |
| 6,944,599 B1 | 9/2005 | Vogel et al. | |
| 6,952,737 B1 | 10/2005 | Coates et al. | |
| 6,963,854 B1 | 11/2005 | Boyd et al. | |
| 6,965,914 B2 | 11/2005 | Dowling | |
| 6,973,176 B1 | 12/2005 | Chism et al. | |
| 6,999,936 B2 | 2/2006 | Sehr | |
| 7,003,485 B1 | 2/2006 | Young | |
| 7,004,388 B2 | 2/2006 | Kohita | |
| 7,010,494 B2 | 3/2006 | Etzioni et al. | |
| 7,023,979 B1 | 4/2006 | Wu et al. | |
| 7,024,552 B1* | 4/2006 | Caswell | G06Q 20/367 380/258 |
| 7,031,945 B1 | 4/2006 | Donner | |
| 7,044,362 B2 | 5/2006 | Yu | |
| 7,058,602 B1 | 6/2006 | La Mura et al. | |
| 7,069,228 B1 | 6/2006 | Rose et al. | |
| 7,069,243 B2 | 6/2006 | Dinwoodie | |
| 7,076,460 B2 | 7/2006 | Dinwoodie | |
| 7,076,558 B1 | 7/2006 | Dunn | |
| 7,080,026 B2 | 7/2006 | Singh et al. | |
| 7,080,030 B2 | 7/2006 | Eglen et al. | |
| 7,080,328 B1 | 7/2006 | Sawyer | |
| 7,080,882 B2 | 7/2006 | Stitt | |
| 7,083,081 B2 | 8/2006 | McGee et al. | |
| 7,085,818 B2 | 8/2006 | Brown et al. | |
| 7,092,892 B1 | 8/2006 | Sobalvarro et al. | |
| 7,093,130 B1 | 8/2006 | Kobayashi et al. | |
| 7,099,841 B1 | 8/2006 | Hall et al. | |
| 7,110,960 B2 | 9/2006 | Phillips et al. | |
| 7,114,179 B1 | 9/2006 | Ritter et al. | |
| 7,124,062 B2 | 10/2006 | Gebhart | |
| 7,127,404 B1 | 10/2006 | Poon | |
| 7,127,408 B2 | 10/2006 | Rosen | |
| 7,133,848 B2 | 11/2006 | Phillips et al. | |
| 7,134,138 B2* | 11/2006 | Scherr | G06F 21/80 711/E12.094 |
| 7,139,916 B2 | 11/2006 | Billingsley et al. | |
| 7,149,549 B1 | 12/2006 | Ortiz et al. | |
| 7,152,043 B2 | 12/2006 | Alaia et al. | |
| 7,152,094 B1 | 12/2006 | Jannu et al. | |
| 7,162,454 B1 | 1/2007 | Donner et al. | |
| 7,171,472 B2 | 1/2007 | O'Brien et al. | |
| 7,177,945 B2 | 2/2007 | Hong et al. | |
| 7,191,147 B2 | 3/2007 | Heene et al. | |
| 7,194,522 B1 | 3/2007 | Swildens et al. | |
| 7,213,754 B2 | 5/2007 | Eglen et al. | |
| 7,228,350 B2 | 6/2007 | Hong et al. | |
| 7,248,888 B2 | 7/2007 | Inselberg | |
| 7,328,166 B1 | 2/2008 | Geoghegan et al. | |
| 7,333,941 B1 | 2/2008 | Choi | |
| 7,333,943 B1 | 2/2008 | Charuk et al. | |
| 7,363,267 B1 | 4/2008 | Vincent et al. | |
| 7,372,952 B1 | 5/2008 | Wu et al. | |
| 7,403,993 B2 | 7/2008 | John et al. | |
| 7,412,042 B2 | 8/2008 | Henry | |
| 7,418,496 B2 | 8/2008 | Macey et al. | |
| 7,555,361 B2 | 6/2009 | Nakamura et al. | |
| 7,555,466 B2 | 6/2009 | Eglen et al. | |
| 7,584,123 B1 | 9/2009 | Karonis et al. | |
| 7,585,372 B2 | 9/2009 | Eglen et al. | |
| 7,587,372 B2 | 9/2009 | Eglen et al. | |
| 7,634,503 B2 | 12/2009 | Venugopal et al. | |
| 7,668,315 B2* | 2/2010 | Quick, Jr. | H04L 9/3271 380/264 |
| 7,720,746 B2 | 5/2010 | Brett | |
| 7,765,299 B2 | 7/2010 | Romero | |
| RE41,545 E | 8/2010 | Young | |
| 7,769,998 B2* | 8/2010 | Lynch | G06F 21/33 713/155 |
| 7,849,133 B2 | 12/2010 | Denker et al. | |
| 7,865,379 B2 | 1/2011 | Sussman et al. | |
| 7,865,598 B2 | 1/2011 | Denker et al. | |
| 8,126,991 B2 | 2/2012 | Smith et al. | |
| 8,266,211 B2 | 9/2012 | Smith et al. | |
| 8,438,622 B2* | 5/2013 | Cynkin | G06F 21/6218 713/159 |
| 8,504,824 B1* | 8/2013 | Abbott | H04L 67/20 380/44 |
| 8,533,796 B1* | 9/2013 | Shenoy | H04L 63/0815 380/229 |
| 8,671,274 B2* | 3/2014 | Ross | H04L 9/3213 713/156 |
| 8,719,912 B2* | 5/2014 | Frey | H04L 9/3213 713/156 |
| 8,775,519 B2 | 7/2014 | Smith et al. | |
| 2001/0005833 A1 | 6/2001 | Asami et al. | |
| 2001/0018660 A1 | 8/2001 | Sehr | |
| 2001/0032115 A1 | 10/2001 | Goldstein | |
| 2001/0034639 A1 | 10/2001 | Jacoby et al. | |
| 2001/0034687 A1 | 10/2001 | Bushonville et al. | |
| 2001/0049652 A1 | 12/2001 | Nakajima | |
| 2001/0056374 A1 | 12/2001 | Joao | |
| 2002/0004762 A1 | 1/2002 | Izumoto | |
| 2002/0022981 A1 | 2/2002 | Goldstein | |
| 2002/0023041 A1 | 2/2002 | Brett | |
| 2002/0023955 A1 | 2/2002 | Frank et al. | |
| 2002/0029296 A1 | 3/2002 | Anuff et al. | |
| 2002/0035605 A1 | 3/2002 | McDowell et al. | |
| 2002/0072999 A1 | 3/2002 | Andres et al. | |
| 2002/0040308 A1 | 4/2002 | Hasegawa et al. | |
| 2002/0040346 A1 | 4/2002 | Kwan | |
| 2002/0042729 A1 | 4/2002 | Yajima et al. | |
| 2002/0042749 A1 | 4/2002 | Yugami et al. | |
| 2002/0052758 A1 | 5/2002 | Arthur et al. | |
| 2002/0052774 A1 | 5/2002 | Parker et al. | |
| 2002/0052965 A1 | 5/2002 | Dowling | |
| 2002/0062236 A1 | 5/2002 | Murashita et al. | |
| 2002/0062265 A1 | 5/2002 | Poon | |
| 2002/0065763 A1 | 5/2002 | Taylor et al. | |
| 2002/0065783 A1 | 5/2002 | Na et al. | |
| 2002/0082879 A1 | 6/2002 | Miller et al. | |
| 2002/0082969 A1 | 6/2002 | O'Keeffe et al. | |
| 2002/0087456 A1 | 7/2002 | Abeshouse et al. | |
| 2002/0091553 A1 | 7/2002 | Callen et al. | |
| 2002/0091555 A1 | 7/2002 | Leppink | |
| 2002/0094090 A1 | 7/2002 | Lino | |
| 2002/0095357 A1 | 7/2002 | Hunter | |
| 2002/0095383 A1 | 7/2002 | Mengin et al. | |
| 2002/0099642 A1 | 7/2002 | Swanki et al. | |
| 2002/0099831 A1 | 7/2002 | Tsunogai | |
| 2002/0103849 A1 | 8/2002 | Smith | |
| 2002/0107726 A1 | 8/2002 | Torrance et al. | |
| 2002/0107779 A1 | 8/2002 | Maltzman | |
| 2002/0116343 A1 | 8/2002 | Nakamura et al. | |
| 2002/0116348 A1 | 8/2002 | Phillips et al. | |
| 2002/0120492 A1 | 8/2002 | Phillips et al. | |
| 2002/0128922 A1 | 9/2002 | Joao | |
| 2002/0133424 A1 | 9/2002 | Joao | |
| 2002/0138325 A1 | 9/2002 | Mashimo et al. | |
| 2002/0138751 A1 | 9/2002 | Dutta | |
| 2002/0138770 A1 | 9/2002 | Dutta | |
| 2002/0138771 A1 | 9/2002 | Dutta | |
| 2002/0143860 A1 | 10/2002 | Catan | |
| 2002/0152458 A1 | 10/2002 | Eyer et al. | |
| 2002/0156715 A1 | 10/2002 | Wall et al. | |
| 2002/0161689 A1 | 10/2002 | Segal | |
| 2002/0169623 A1 | 11/2002 | Call et al. | |
| 2002/0169694 A1 | 11/2002 | Stone et al. | |
| 2002/0174026 A1 | 11/2002 | Pickover et al. | |
| 2002/0178018 A1 | 11/2002 | Gillis et al. | |
| 2002/0178093 A1 | 11/2002 | Dean et al. | |
| 2002/0178226 A1 | 11/2002 | Anderson et al. | |
| 2002/0188523 A1 | 12/2002 | Hyyppa et al. | |
| 2002/0188551 A1 | 12/2002 | Grove et al. | |
| 2002/0194267 A1 | 12/2002 | Flesner et al. | |
| 2003/0007627 A1 | 1/2003 | Elsey et al. | |

(56) References Cited

U.S. PATENT DOCUMENTS

| | | |
|---|---|---|
| 2003/0023500 A1 | 1/2003 | Boies et al. |
| 2003/0024988 A1 | 2/2003 | Stanard |
| 2003/0036966 A1 | 2/2003 | Amra et al. |
| 2003/0040943 A1 | 2/2003 | Bates et al. |
| 2003/0061303 A1 | 3/2003 | Brown et al. |
| 2003/0067464 A1 | 4/2003 | Gathman et al. |
| 2003/0069762 A1 | 4/2003 | Gathman et al. |
| 2003/0069763 A1 | 4/2003 | Gathman et al. |
| 2003/0069764 A1 | 4/2003 | Gathman et al. |
| 2003/0069789 A1 | 4/2003 | Gathman et al. |
| 2003/0069810 A1 | 4/2003 | Gathman et al. |
| 2003/0069827 A1 | 4/2003 | Gathman et al. |
| 2003/0069829 A1 | 4/2003 | Gathman et al. |
| 2003/0093387 A1 | 5/2003 | Nakfoor |
| 2003/0099197 A1 | 5/2003 | Yokota et al. |
| 2003/0105641 A1 | 6/2003 | Lewis |
| 2003/0154142 A1 | 8/2003 | Ginsburg et al. |
| 2003/0154169 A1 | 8/2003 | Yanai |
| 2003/0163373 A1 | 8/2003 | Cornateanu |
| 2003/0164400 A1 | 9/2003 | Boyd |
| 2003/0171960 A1 | 9/2003 | Skinner |
| 2003/0177022 A1 | 9/2003 | Francis |
| 2003/0185197 A1 | 10/2003 | Banerjee et al. |
| 2003/0187802 A1 | 10/2003 | Booth |
| 2003/0200137 A1 | 10/2003 | Drummond |
| 2003/0208392 A1 | 11/2003 | Shekar et al. |
| 2003/0229790 A1 | 12/2003 | Russell |
| 2003/0233337 A1 | 12/2003 | Yanase et al. |
| 2003/0236736 A1 | 12/2003 | Harmon et al. |
| 2004/0006497 A1 | 1/2004 | Nestor et al. |
| 2004/0015380 A1 | 1/2004 | Timmins |
| 2004/0015409 A1 | 1/2004 | Chittenden et al. |
| 2004/0019571 A1 | 1/2004 | Hurwitz et al. |
| 2004/0039635 A1 | 2/2004 | Linde et al. |
| 2004/0039660 A1 | 2/2004 | Prescott |
| 2004/0039696 A1 | 2/2004 | Harmon et al. |
| 2004/0049412 A1 | 3/2004 | Johnson |
| 2004/0054574 A1 | 3/2004 | Kaufman et al. |
| 2004/0073439 A1 | 4/2004 | Shuster |
| 2004/0083156 A1 | 4/2004 | Schulze |
| 2004/0086257 A1 | 5/2004 | Werberg et al. |
| 2004/0093175 A1 | 5/2004 | Tan |
| 2004/0093302 A1 | 5/2004 | Baker et al. |
| 2004/0111303 A1 | 6/2004 | Francis |
| 2004/0128257 A1 | 6/2004 | Okamoto et al. |
| 2004/0128516 A1 | 6/2004 | Okamoto et al. |
| 2004/0138962 A1 | 7/2004 | Kopelman et al. |
| 2004/0148219 A1 | 7/2004 | Norris |
| 2004/0153374 A1 | 8/2004 | Nelson |
| 2004/0172270 A1 | 9/2004 | Sugimoto et al. |
| 2004/0181438 A1 | 9/2004 | Hoene et al. |
| 2004/0186765 A1 | 9/2004 | Kataoka |
| 2004/0193464 A1 | 9/2004 | Szrek et al. |
| 2004/0204990 A1 | 10/2004 | Lee et al. |
| 2004/0204991 A1 | 10/2004 | Monahan et al. |
| 2004/0205074 A1 | 10/2004 | Berkery et al. |
| 2004/0215527 A1 | 10/2004 | Grove et al. |
| 2004/0220821 A1 | 11/2004 | Ericsson et al. |
| 2004/0225540 A1 | 11/2004 | Waytena et al. |
| 2004/0236629 A1 | 11/2004 | Martin |
| 2004/0254818 A1 | 12/2004 | Rosen |
| 2004/0260659 A1 | 12/2004 | Chan et al. |
| 2005/0001711 A1 | 1/2005 | Doughty et al. |
| 2005/0004818 A1 | 1/2005 | Liman |
| 2005/0004819 A1 | 1/2005 | Etzioni et al. |
| 2005/0015303 A1 | 1/2005 | Dubin et al. |
| 2005/0015308 A1 | 1/2005 | Grove et al. |
| 2005/0021364 A1 | 1/2005 | Nakfoor |
| 2005/0021365 A1 | 1/2005 | Nakfoor |
| 2005/0021417 A1 | 1/2005 | Kassan |
| 2005/0021447 A1 | 1/2005 | Lawrence |
| 2005/0021450 A1 | 1/2005 | Nakfoor |
| 2005/0027573 A1 | 2/2005 | Silberstein |
| 2005/0027608 A1 | 2/2005 | Wiesmuller et al. |
| 2005/0027641 A1 | 2/2005 | Grove et al. |
| 2005/0027863 A1 | 2/2005 | Talwar et al. |
| 2005/0043994 A1 | 2/2005 | Walker et al. |
| 2005/0055275 A1 | 3/2005 | Newman et al. |
| 2005/0060271 A1 | 3/2005 | Vig |
| 2005/0060399 A1 | 3/2005 | Murakami et al. |
| 2005/0065866 A1 | 3/2005 | Grove et al. |
| 2005/0071245 A1 | 3/2005 | Norins, Jr. et al. |
| 2005/0091069 A1 | 4/2005 | Chuang |
| 2005/0125333 A1 | 6/2005 | Giannetti |
| 2005/0131809 A1 | 6/2005 | Watt, II et al. |
| 2005/0132267 A1 | 6/2005 | Aviv |
| 2005/0138175 A1 | 6/2005 | Kumar et al. |
| 2005/0139661 A1 | 6/2005 | Eglen et al. |
| 2005/0139662 A1 | 6/2005 | Eglen et al. |
| 2005/0140675 A1 | 6/2005 | Billingsley et al. |
| 2005/0144115 A1 | 6/2005 | Brett |
| 2005/0149458 A1 | 7/2005 | Eglen et al. |
| 2005/0160020 A1 | 7/2005 | Asher et al. |
| 2005/0165758 A1 | 7/2005 | Kasten et al. |
| 2005/0193333 A1 | 9/2005 | Ebert |
| 2005/0198107 A1 | 9/2005 | Cuhls et al. |
| 2005/0204148 A1* | 9/2005 | Mayo ............... H04L 63/0815 713/185 |
| 2005/0209914 A1 | 9/2005 | Nguyen et al. |
| 2005/0209921 A1 | 9/2005 | Roberts et al. |
| 2005/0209954 A1 | 9/2005 | Asher et al. |
| 2005/0213742 A1 | 9/2005 | Fukuzawa |
| 2005/0228722 A1 | 10/2005 | Embree |
| 2005/0240453 A1 | 10/2005 | Lyons |
| 2005/0260659 A1 | 11/2005 | Harris et al. |
| 2005/0273405 A1 | 12/2005 | Chen |
| 2005/0286532 A1 | 12/2005 | Mengerink |
| 2006/0010029 A1 | 1/2006 | Gross |
| 2006/0017541 A1 | 1/2006 | Nguyen |
| 2006/0046717 A1 | 3/2006 | Bovell et al. |
| 2006/0057079 A1 | 3/2006 | Pickover |
| 2006/0069780 A1 | 3/2006 | Batni et al. |
| 2006/0082439 A1 | 4/2006 | Bazakos et al. |
| 2006/0085308 A1 | 4/2006 | Metzger |
| 2006/0085396 A1 | 4/2006 | Evans et al. |
| 2006/0095344 A1 | 5/2006 | Nakfoor |
| 2006/0100985 A1 | 5/2006 | Mark et al. |
| 2006/0105783 A1 | 5/2006 | Giraldin et al. |
| 2006/0108418 A1 | 5/2006 | Rice |
| 2006/0111959 A1 | 5/2006 | Tarr et al. |
| 2006/0111967 A1 | 5/2006 | Forbes |
| 2006/0116916 A1 | 6/2006 | Bowman et al. |
| 2006/0124734 A1 | 6/2006 | Wallerstorfer et al. |
| 2006/0126201 A1 | 6/2006 | Jain |
| 2006/0129476 A1 | 6/2006 | Chin et al. |
| 2006/0140374 A1 | 6/2006 | Light et al. |
| 2006/0143094 A1 | 6/2006 | Kohout et al. |
| 2006/0143109 A1 | 6/2006 | Gael |
| 2006/0143698 A1 | 6/2006 | Ohara |
| 2006/0144946 A1 | 7/2006 | Kuriyama et al. |
| 2006/0147005 A1 | 7/2006 | Taub |
| 2006/0147024 A1 | 7/2006 | Dezonno et al. |
| 2006/0148566 A1 | 7/2006 | Lakshminarasimha |
| 2006/0155659 A1 | 7/2006 | DiCesare |
| 2006/0155857 A1 | 7/2006 | Feenan et al. |
| 2006/0161474 A1 | 7/2006 | Diamond et al. |
| 2006/0167756 A1 | 7/2006 | VonBergen et al. |
| 2006/0178930 A1 | 8/2006 | Kim |
| 2006/0190387 A1 | 8/2006 | Molloy |
| 2006/0190388 A1 | 8/2006 | Molloy |
| 2006/0190389 A1 | 8/2006 | Molloy |
| 2006/0190390 A1 | 8/2006 | Molloy |
| 2006/0195356 A1 | 8/2006 | Nerenhausen et al. |
| 2006/0208074 A1 | 9/2006 | Eglen et al. |
| 2006/0232110 A1 | 10/2006 | Ovadia |
| 2006/0244564 A1 | 11/2006 | Madsen |
| 2006/0247954 A1 | 11/2006 | Hunt |
| 2006/0249572 A1 | 11/2006 | Chen et al. |
| 2006/0253380 A1 | 11/2006 | Adcock et al. |
| 2006/0271462 A1 | 11/2006 | Harmon |
| 2006/0277130 A1 | 12/2006 | Harmon |
| 2006/0287898 A1 | 12/2006 | Murashita et al. |
| 2006/0293929 A1 | 12/2006 | Wu et al. |
| 2006/0293994 A1 | 12/2006 | Stuart |

(56) References Cited

U.S. PATENT DOCUMENTS

| | | |
|---|---|---|
| 2007/0012765 A1 | 1/2007 | Trinquet et al. |
| 2007/0017979 A1 | 1/2007 | Wu |
| 2007/0022020 A1 | 1/2007 | Bernstein |
| 2007/0027794 A1 | 2/2007 | Brett |
| 2007/0027798 A1 | 2/2007 | Brett |
| 2007/0033131 A1 | 2/2007 | Brett |
| 2007/0038582 A1 | 2/2007 | Brett |
| 2007/0055554 A1 | 3/2007 | Sussman et al. |
| 2007/0075136 A1 | 4/2007 | Jacob |
| 2007/0087756 A1 | 4/2007 | Hoffberg |
| 2007/0124232 A1 | 5/2007 | Brett |
| 2007/0124259 A1 | 5/2007 | Sussman et al. |
| 2007/0130022 A1 | 6/2007 | Prescott |
| 2007/0143185 A1 | 6/2007 | Harmon et al. |
| 2007/0143194 A1 | 6/2007 | Fraser et al. |
| 2007/0245351 A1 | 10/2007 | Sussman et al. |
| 2007/0250400 A1 | 10/2007 | Eglen et al. |
| 2008/0015968 A1 | 1/2008 | Van Luchene et al. |
| 2008/0021998 A1 | 1/2008 | Wentink |
| 2008/0027827 A1 | 1/2008 | Eglen et al. |
| 2008/0056165 A1 | 3/2008 | Petrovykh |
| 2008/0059384 A1 | 3/2008 | Eglen et al. |
| 2008/0065566 A1 | 3/2008 | Eglen et al. |
| 2008/0065567 A1 | 3/2008 | Eglen et al. |
| 2008/0077505 A1 | 3/2008 | Ilechko et al. |
| 2008/0103934 A1 | 5/2008 | Gibson et al. |
| 2008/0194987 A1 | 8/2008 | Boecker |
| 2008/0215452 A1 | 9/2008 | Eglen et al. |
| 2008/0215507 A1 | 9/2008 | Eglen et al. |
| 2008/0221948 A1 | 9/2008 | Eglen et al. |
| 2008/0235110 A1 | 9/2008 | Carter et al. |
| 2008/0243532 A1 | 10/2008 | Leach et al. |
| 2008/0243838 A1 | 10/2008 | Scott et al. |
| 2008/0255867 A1 | 10/2008 | Nishikawa et al. |
| 2008/0262903 A1 | 10/2008 | Keser et al. |
| 2008/0300956 A1 | 12/2008 | Nishikawa et al. |
| 2009/0043637 A1 | 2/2009 | Eder |
| 2009/0063207 A1 | 3/2009 | Brodzeller |
| 2009/0132904 A1 | 5/2009 | Holloway et al. |
| 2009/0292593 A1 | 11/2009 | Seki et al. |
| 2010/0082491 A1 | 4/2010 | Rosenblatt et al. |
| 2010/0106653 A1 | 4/2010 | Sandholm et al. |
| 2010/0113072 A1 | 5/2010 | Gibson et al. |
| 2010/0169130 A1 | 7/2010 | Fineman et al. |
| 2014/0149742 A1* | 5/2014 | Yau ................... H04L 63/083 713/159 |
| 2014/0280598 A1 | 9/2014 | Smith et al. |
| 2015/0081352 A1 | 3/2015 | Smith et al. |

FOREIGN PATENT DOCUMENTS

| | | |
|---|---|---|
| EP | 0370146 A | 5/1990 |
| EP | 0828223 A2 | 3/1998 |
| EP | 1054335 A2 | 11/2000 |
| EP | 1069539 A2 | 1/2001 |
| JP | 53 142300 A | 12/1978 |
| JP | 53142300 A | 12/1978 |
| JP | 5266049 | 10/1993 |
| JP | 11031204 A | 2/1999 |
| WO | 88/03295 | 5/1988 |
| WO | 98/10361 | 3/1998 |
| WO | 99/06928 | 2/1999 |
| WO | 99/18533 | 4/1999 |
| WO | 99/38129 | 7/1999 |
| WO | 99/60489 | 11/1999 |
| WO | 0028485 | 5/2000 |
| WO | 00/62260 | 10/2000 |
| WO | 00/74520 A1 | 12/2000 |
| WO | 00/75838 A1 | 12/2000 |
| WO | 01/03040 A1 | 1/2001 |
| WO | 01/08065 A1 | 2/2001 |
| WO | 01/39055 | 5/2001 |
| WO | 01/41021 A1 | 6/2001 |
| WO | 01/41085 A2 | 6/2001 |
| WO | 01/44892 A2 | 6/2001 |
| WO | 01/52139 A1 | 7/2001 |
| WO | 01/59649 A1 | 8/2001 |
| WO | 01/59658 A1 | 8/2001 |
| WO | 01/71669 A2 | 9/2001 |
| WO | 01/84473 | 11/2001 |
| WO | 02/03171 A2 | 1/2002 |
| WO | 02/03174 | 1/2002 |
| WO | 02/35322 A2 | 5/2002 |
| WO | 03/027808 A2 | 4/2003 |

OTHER PUBLICATIONS

Vanderporten, "Strategic Behavior in Pooled Condominium Auctions", Journal of Urban Economics 31, pp. 123-137 (1992).
"Fairs and Festivals/Celebrating the Island", May 20, 2001, Newsday, Nassau and Suffolk Edition, pp. 186.
Article: Business Wire: Season Ticket Solutions Announces Availability of Ticket Exchange for Sporting Teams and Entertainment Venues; Jul. 30, 2001; 3 pages.
Bapna et al. (2000). A theoretical and empirical investigation of multi-item on-line auctions. Information Technology and Management, 1 (1-2), 1. Retrieved Jan. 13, 2011, from ABI/INFORM Global. (Document ID: 501065481 ).
Beam et al. (1999). On Negotiations and Deal Making in Electronic Markets. Information Systems Frontiers, 1 (3),241-258. Retrieved Jan. 13, 2011, from ABI/INFORM Global. (Document ID: 404814251).
International Search Report and Written Opinion; PCT/US08/72364 (filing date Aug. 6, 2008); dated Jan. 30, 2009.
Courty et al. "An Economic Guide to Ticket Pricing in the Entertainment Industry," London Business School, pp. 167-192.
Chui, et al. "Auction on the Internate—A Preliminary Study", Department of Marketing, HK University of Science and Technology; 1999, pp. 1-7.
Asokan, et al. "SEMPER Consortium: Advanced Services, Architecture and Design", Deliverable D10 of ACTS Project ACO26, Mar. 15, 1999.
U.S. Appl. No. 09/702,794, filed Nov. 1, 2000.
International Search Report and Written Opinion (dated Apr. 11, 2008); International Application No. PCT/US0?/86651; Filed Dec. 6, 2007.
Article from Website; Tech Web; "Byter Up: Ballparks Go High-Tech"; Mar. 31, 1999 (4 pages).
Article from Website; Sports Venue Technology; "Pacific Bell Park, San Francisco"; (5 pages).
"Acteva and Enspot.com Sign Agreement to Provide On-Line Ticketing, Broader Distribution", Business Wire (Dec. 3, 1999).
"AuctionNet Still One-of-a-Kind", Automotive News, S12 (Sep. 20, 1993).
"Cathay Pacific Airways Auctions a Boeing 747—400 Worth of Seats in Third Cybertraveler Auction", Business Wire (Apr. 29, 1996).
"Cathay Pacific Airways-USA Receives More than 1,300 Bids During First Five Days of CyberAuction", Business Wire (Oct. 18, 1995).
"Cathay Pacific Airways-USA to Hold First-Ever Internet CyberAuction", Business Wire (Sep. 26, 1995).
"E-TicketBoard Launches PSL Xchange for Eight NFL Teams", PR Newswire (Jul. 18, 2000).
"E-Ticket Board Launches Revolutionary New Site-SeatsandSuites", PR Newswire (Oct. 17, 2000).
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).
Jackson, "Media Futures: This Bazaar Could Put Retailers Under the Hammer", Financial Times (May 25, 1995).
Hes, et al. "At Face Value" On biometrical identification and privacy, Registratiekamer, Sep. 1999; 78 pages.
Jenkins, "Giants Draw Fans into Web Team Helps Season-Ticket Holders Get Mileage Out of Plans", USA Today, p. 3C (Jun. 27, 2000).

(56) References Cited

OTHER PUBLICATIONS

Kasper, "Purchase Griz Playoff Tickets Now", Missoulian Online (May 3, 2001).
Koenig, "Texas Firm Links Sports Teams, Fans", Amarillo Globe-News, Feb. 20, 2000).
Kravets, "Going, Going, Gone! Real Estate Auctions in the 90s", Probate & Property, p. 38 (May/Jun. 1993).
Kroll et al, "The Commodity Futures Market Guide", Harper and Row, pp. 9-10 (1973).
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http://www.sfb504.unimannheim.de/publications/dp99-75.pdf (Jul. 14, 1999).
Muret, "More Teams Gearing up to Offer Option of Stored-Credit Tickets", Street & Smith's Sports Business Journal, p. 12 (Jul. 9, 2007).
"Keyware Unveils Multi-Application Smart Card Suite", Card News, vol. 16, No. 10 (May 30, 2001).
"Online Movie Ticket Site Launched in China", China Online (Dec. 23, 1999).
"On Sale Brings Thrill of the Auction to the Web", Link-up p. 34 (Jul./Aug. 1995).
"Season Ticket Solutions Announces Availability of Ticket Exchange for Sporting Teams and Entertainment Venues", Business Wire (Jul. 30, 2001).
"WBGH to Hold Online Computer Auction", Link-Up, p. 10 (Sep./Oct. 1988).
Banatre, "Distributed Auction Bidding System", International Computing Symposium, vol. 4, No. 4 Aug. 1981).
Banks, "PSL Put Owners on the Hot Seat", St. Petersburg Times, p. 1 OC (Oct. 31, 1993).
Beam et al, "Electronic Negotiation through Internet-Based Auctions", CITM Working Paper 96-WP-1019, http://haas.berkeley.edu/citm/publications/papers/wp-1 019.pdf (Dec. 1996).
Blau, "Dormitories See Departure from Previous Years' Trends", The Tech, vol. 116, No. 38 (Aug. 30, 1996).
Boyes et al, "Auctions as an Allocation Mechanism in Academia: The Case of Faculty Offices", Journal of Economic Perspectives, vol. 3, No. 3, pp. 37-40 (Summer 1989).
Collier, "Columbia, S.C.-Based Internet Firm Helps Buy, Sell Sports Tickets", The State, (Oct. 23, 2000).
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
Fisher, "Secondary Market in Consolidation Mode", Street & Smith's Sports Business Journal, p. 3 (Jul. 23, 2007).
Flint, "Cyber Hope or Cyber Hype?", Air Transport World (Oct. 1996).
Garza, "Space Cruise", Reason (May 2000).
Happel, et al.; "Creating a Futures Market for Major Event Tickets: Problems and Pros(;!ects"; *Cato Journal*, vol. 21, No. 3; 2002 (pp. 443-461).
Harlan, "At Least it isn't the Team's Ball that's in Somebody Else's Court", Wall Street Journal (Jun. 4, 1991).
New Straits Times, "Wanted Live in Concert postponed to after Raya", Oct. 25, 2000, Kuala Lumpur, p. 15.

Office Action dated Nov. 25, 2008, U.S. Appl. No. 11/386,459 (001a).
Office Action dated May 26, 2009, U.S. Appl. No. 11/386,459 (001a).
Office Action dated Jun. 26, 2009, U.S. Appl. No. 11/702,344 (C3).
Office Action dated Jul. 21, 2009, U.S. Appl. No. 11/699,283 (C1).
U.S. Appl. No. 14/289,010, Preinterview first office action dated Oct. 1, 2014, 3 pages.
Pelline, "Cathay Pacific to Auction Off Airline Tickets on the Internet", San Francisco Chronicle, p. C4 (Apr. 30, 1996).
Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).
Rubel, "ETM to Ticketmaster: Let's Rock", Marketing News (Jun. 19, 1995).
Shulman, "VICS and Quick Response: Priority Issues for Mass Merchandisers", Supermarket Business, vol. 44, No. 10, p. 13(4) (Oct. 1989).
Stevenson, "Frosh Get at Least Fifth Choice Dorm: Women Find Shortage of Single-Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post-Dispatch, p. D8 (Dec. 3, 1999).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www .internetretailer.com/printArticle.asp?id=3164 (Mar. 2001).
Nestor et al, "Transforming Tickets from a Commodity into a Valuable Strategic Asset", Global eTicket Exchange whitepaper, Oct. 13, 2000.
O'Neil, "Q and A", St. Louis Post-Dispatch, p. 4D (Jan. 19, 1995).
PCT Search International Search Report and Written Opinion, PCT Application No. PCT/US09/42889, dated Aug. 24, 2009.
U.S. Appl. No. 14/553,936, First Action Interview—Office Action dated Jul. 10, 2015, 6 pages.
Fujimura, "XML Ticket: Generalized Digital Ticket Definition Language", The W3C Signed XML Workshop—Copyright © 1999, 33 pages.
Matsuyama, et al. "Distributed Digital-Ticket Management for Rights Trading System", E-Commerce, 1999; pp. 110-118.
In, Shirley Siu Weng, "A Proposed Electronic Ticket Management for trading Service in Internet", Feb. 9, 2001; 7 pages.
Article from Smart Card News, "Major Players Form Proton World International", Aug. 1998, pp. 141-160.
Fujimura, et al. "General-purpose Digital Ticket Framework", NTT Information and Communication Systems Labs, USENIX Workshop on Electronic Commerce; Aug. 31-Sep. 1998.
Fujimura, et al. "Digital-Ticket-Controlled Digital Ticket Circulation", NTT Information Sharing Platform Laboratories, USENIX Security Symposium, Aug. 23-26, 1999.
Final Office Action under U.S. Appl. No. 10/731,410 dated Apr. 8, 2011 (TICKMA.002A).
International Search Report for PCT Application- PCT /US06/10295, dated Sep. 14, 2007.
Krueger, "Music Sales Slump, Concert Tickets Costs Jump and Rock Fans Pay the Price", Oct. 17, 2002, New York Times, Late Edition, pp. C.2.
Milwaukee Journal Sentinel, "Riverside comedy show canceled", Aug. 2, 1996, Milwaukee, Wis. p. 7.
Nelson. (Sep. 1, 2003). Ticketmaster Auction Will Let Highest Bidder Set Concert Prices. New York Times (Late Edition (East Coast)), p. C.6. Retrieved Jan. 13, 2011, from Banking Information Source. (Document 10: 390429941).
PCT International Search Report and Written Opinion dated Feb. 14, 2008; (International Application No. PCT/US07/03082, filed Feb. 6, 2007).
International Search Report and Written Opinion; International Application No. PCT/US2008/075265; dated Jun. 24, 2009.
Block, Adam, "Stubhub (a): Jan. 2004," Case Study No. SM-132A prepared for Stanford Graduate School of Business, Copyright

(56) References Cited

OTHER PUBLICATIONS

2005, Board of Trustees of the Leland Stanford Junior University (Exhibit C to Request for Ex Parte Reexamination of U.S. Pat. No. 8,126,991 B2).
Dubin Claim Chart Jun. 5, 2012 (Exhibit H to Request for Ex Parte Reexamination of U.S. Pat. No. 8,126,991 B2).
Jannu Claim Chart Jun. 5, 2012 (Exhibit L to Request for Ex Parte Reexamination of United States Patent No. 8,126,991 B2).
Linthicum Claim Chart Jun. 5, 2012 (Exhibit J to Request for Ex Parte Reexamination of U.S. Pat. No. 8,126,991 B2).
Linthicum, David S., "Enterprise Application Integration," © 2000, Addison-Wesley Longman, Inc., Fifth Printing, Dec. 2003 (Exhibit D to Request for Ex Parte Reexamination of U.S. Pat. No. 8,126,991 B2) (divided into 8 parts, pp. 1-75).
Linthicum, David S., "Enterprise Application Integration," © 2000, Addison-Wesley Longman, Inc., Fifth Printing, Dec. 2003 (Exhibit D to Request for Ex Parte Reexamination of United States Patent No. 8,126,991 B2) (divided into 8 parts, pp. 76-1 00).
Linthicum, David S., "Enterprise Application Integration," © 2000, Addison-Wesley Longman, Inc., Fifth Printing, Dec. 2003 (Exhibit D to Request for Ex Parte Reexamination of U.S. Pat. No. 8,126,991 B2) (divided into 8 parts, pp. 101-150).
Linthicum, David S., "Enterprise Application Integration," © 2000, Addison-Wesley Longman, Inc., Fifth Printing, Dec. 2003 (Exhibit D to Request for Ex Parte Reexamination of U.S. Pat. No. 8,126,991 B2) (divided into 8 parts, pp. 151-200).
Linthicum, David S., "Enterprise Application Integration," © 2000, Addison-Wesley Longman, Inc., Fifth Printing, Dec. 2003 (Exhibit D to Request for Ex Parte Reexamination of U.S. Pat. No. 8,126,991 B2) (divided into 8 parts, pp. 201-250).
Linthicum, David S., "Enterprise Application Integration," © 2000, Addison-Wesley Longman, Inc., Fifth Printing, Dec. 2003 (Exhibit D to Request for Ex Parte Reexamination of U.S. Pat. No. 8,126,991 B2) (divided into 8 parts, pp. 251-300).
Weiner, "Are the Days Numbered for the Paper Ticket?", Street & Smith's Sports Business Journal, p. 17 (Jun. 18, 2007).
www.TicketOptions.com Web Pages, as retrieved from archive.org (2001).
wwwSeasonTicket.com Web Pages, as retrieved from archive.org (2001).
Zoltak, "Advantix Acquisitions Continue with Protix Deal", Amusement Business (Nov. 2, 1998).
U.S. Appl. No. 14/553,936 Notice of Allowance dated Oct. 27, 2015, 13 pages.
Invitation to Pay Additional Fees and Partial International Search Report; International Appln. No. PCT/US2008/075265; dated Apr. 15, 2009.
U.S. Appl. No. 14/289,010, Notice of Allowance dated Dec. 12, 2014, 14 pages.
Office Action dated Jul. 27, 2009, U.S. Appl. No. 11/702,803 (C2).
Office Action dated Aug. 5, 2009, U.S. Appl. No. 11/702,733.
Office Action dated Oct. 8, 2009, U.S. Appl. No. 11/702,993 (C4).
Office Action dated Apr. 7, 2010, U.S. Appl. No. 12/187,272.
Office Action dated Apr. 13, 2010, U.S. Appl. No. 12/187,295.
Office Action in U.S. Appl. No. 11/453,286, dated Nov. 5, 2007.
Office Action dated Jul. 27, 2007 in U.S. Appl. No. 11/475,733.
Office Action dated Aug. 2, 2007 in U.S. Appl. No. 11/453,286.
Office Action under U.S. Appl. No. 10/731,410 dated Sep. 1, 2010 (TICKMA.002A).
Office Action under U.S. Appl. No. 10/731,410 dated Oct. 2, 2009 (TICKMA.002A).
Pan et al. "Team performance, market characteristics, and attendance of Major League Baseball: A panel data analysis" Mid-Atlantic Journal of Business, v35n2/3, pp: 77-91 Jun./Sep. 1999 ISSN: 0732-9334.
Sullivan et al., ".NET e-Business Architecture," © 2002, Sams Publishing, First Printing, Nov. 2001 (Exhibit E to Request for Ex Parte Reexamination of U.S. Pat. No. 8,126,991 B2)(divided into 12 parts) (pp. 351-400).
Sullivan et al., ".NET e-Business Architecture," © 2002, Sams Publishing, First Printing, Nov. 2001 (Exhibit E to Request for Ex Parte Reexamination of U.S. Pat. No. 8,126,991 B2) (divided into 12 parts) (pp. 401-450).
Sullivan et al., ".NET e-Business Architecture," © 2002, Sams Publishing, First Printing, Nov. 2001 (Exhibit E to Request for Ex Parte Reexamination of U.S. Pat. No. 8,126,991 B2)(divided into 12 parts) (pp. 451-500).
Sullivan et al., ".NET e-Business Architecture,"© 2002, Sams Publishing, First Printing, Nov. 2001 (Exhibit E to Request for Ex Parte Reexamination of U.S. Pat. No. 8,126,991 B2) (divided into 12 parts) (pp. 501-550).
Sullivan et al., ".NET e-Business Architecture," © 2002, Sams Publishing, First Printing, Nov. 2001 (Exhibit E to Request for Ex Parte Reexamination of U.S. Pat. No. 8,126,991 B2) (divided into 12 parts) (pp. 551-606).
U.S. Appl. No. 12/204,648, Non-Final Office Action dated Apr. 1, 2011, 28 pages.
U.S. Appl. No. 12/204,648, Notice of Allowance dated Nov. 25, 2011, 9 pages.
U.S. Appl. No. 13/358,469, Notice of Allowance dated May 4, 2012, 15 pages.
U.S. Appl. No. 13/606,934, Non-Final Office Action dated Jan. 6, 2014, 5 pages.
U.S. Appl. No. 13/606,934, Notice of Allowance dated Apr. 4, 2014, 6 pages.
U.S. Appl. No. 90/012,339, Request for Ex Parte Reexamination filed on Jun. 5, 2012, 118 pages.
U.S. Appl. No. 90/012,339, Determination-Reexam Ordered filed on Sep. 10, 2012, 19 pages.
U.S. Appl. No. 90/012,339, Non-Final Office Action filed on Jan. 17, 2013, 20 pages.
U.S. Appl. No. 90/012,339, Notice of Intent to Issue a Reexam Certificate filed on Jun. 5, 2013, 13 pages.
Linthicum, David S., "Enterprise Application Integration," © 2000, Addison-Wesley Longman, Inc., Fifth Printing, Dec. 2003 (Exhibit D to Request for Ex Parte Reexamination of U.S. Pat. No. 8,126,991 B2) (divided into 8 parts, pp. 301-350).
Linthicum, David S., "Enterprise Application Integration," © 2000, Addison-Wesley Longman, Inc., Fifth Printing, Dec. 2003 (Exhibit D to Request for Ex Parte Reexamination of U.S. Pat. No. 8,126,991 B2) (divided into 8 parts, pp. 351-405).
Murakami Claim Chart Jun. 5, 2012 (Exhibit M to Request for Ex Parte Reexamination of U.S. Pat. No. 8,126,991 B2).
Stub Hub Claim Chart Jun. 5, 2012 (Exhibit I to Request for Ex Parte Reexamination of U.S. Pat. No. 8,126,991 B2).
Sullivan Claim Chart Jun. 5, 2012 (Exhibit K to Request for Ex Parte Reexamination of U.S. Pat. No. 8,126,991 B2).
Sullivan et al., ".NET e-Business Architecture," © 2002, Sams Publishing, First Printing, Nov. 2001 (Exhibit E to Request for Ex Parte Reexamination of U.S. Pat. No. 8,126,991 B2)(divided into 12 parts) (pp. 1-50).
Sullivan et al., ".NET e-Business Architecture," © 2002, Sams Publishing, First Printing, Nov. 2001 (Exhibit E to Request for Ex Parte Reexamination of U.S. Pat. No. 8,126,991 B2)(divided into 12 parts) (pp. 51-100).
Sullivan et al., ".NET e-Business Architecture," © 2002, Sams Publishing, First Printing, Nov. 2001 (Exhibit E to Request for Ex Parte Reexamination of U.S. Pat. No. 8,126,991 B2) (divided into 12 parts) (pp. 101-150).
Sullivan et al., ".NET e-Business Architecture," © 2002, Sams Publishing, First Printing, Nov. 2001 (Exhibit E to Request for Ex Parte Reexamination of U.S. Pat. No. 8,126,991 B2)(divided into 12 parts) (pp. 151-200).
Sullivan et al., ".NET e-Business Architecture," © 2002, Sams Publishing, First Printing, Nov. 2001 (Exhibit E to Request for Ex Parte Reexamination of U.S. Pat. No. 8,126,991 B2) (divided into 12 parts) (pp. 201-250).
Sullivan et al., ".NET e-Business Architecture," © 2002, Sams Publishing, First Printing, Nov. 2001 (Exhibit E to Request for Ex Parte Reexamination of U.S. Pat. No. 8,126,991 B2) (divided into 12 parts) (pp. 251-300).

(56) References Cited

OTHER PUBLICATIONS

Sullivan et al., ".NET e-Business Architecture," © 2002, Sams Publishing, First Printing, Nov. 2001 (Exhibit E to Request for Ex Parte Reexamination of U.S. Pat. No. 8,126,991 B2) (divided into 12 parts) (pp. 301-350).
U.S. Appl. No. 12/204,648, Notice of Allowance dated Nov. 25, 2014, 6 pages.
U.S. Appl. No. 12/204,648, Non-Final Office Action dated Apr. 1, 2011, 17 pages.
Request for Ex Parte Reexamination of U.S. Pat. No. 8,126,991 82 to Smith eta/. Under 35 U.S.C. § 302 and 37 C.F.R. § 1.510, Jun. 5, 2012.
Scheff, "Factors Influencing Subscription and Single-Ticket Purchases at Performing Arts Organizations," 1999, International Journal of Arts Management, pp. 16-27.
Smith, Ethan, "The Perks and Perils of VIP Ticketing; U2 Snafu Shows Downside of Efforts to Provide Fan Clubs With Special Deals", Feb. 1, 2005, Wall Street Journal, pp. 1-3.
Stubhub, "Buyer Handbook", Apr. 2, 2002, www.stubhub.com.
www.trashcity.org (web archive Jan. 12, 2004).
Yael Schacher, "Ticket Scalping", Jun. 11, 2001, Gotham Gazette, http://www.gothamgazette.com/articieII20010611/200/165.
Yates, Kristen, "Premium Season Tickets May Actually Be Bargain," Jun. 25, 1996, Madison Capital Times, p. 1C.

\* cited by examiner

CONTROLLED TOKEN DISTRIBUTION TO PROTECT AGAINST MALICIOUS DATA AND RESOURCE ACCESS

CROSS REFERENCE TO RELATED APPLICATIONS

The present application is a continuation-in-part application which claims the priority benefit under 35 USC 119(e) to each of: (1) U.S. Ser. No. 14/973,205, filed on Dec. 17, 2015, which claims priority to U.S. Provisional Application No. 62/093,828, filed on Dec. 18, 2014; (2) U.S. Ser. No. 12/435,972, filed on May 5, 2009, which claims priority to U.S. Provisional Application No. 61/050,543, filed May 5, 2008; and (3) U.S. Ser. No. 14/617,765, filed on Feb. 9, 2015, which is a continuation of U.S. Ser. No. 14/289,010, filed May 28, 2014, now U.S. Pat. No. 9,491,230, issued Nov. 8, 2016, which is a continuation of U.S. Ser. No. 13/606,934, filed Sep. 7, 2012, now U.S. Pat. No. 8,775,519, issued Feb. 8, 2014, which is a divisional application of U.S. Ser. No. 13/358,469, filed Jan. 25, 2012, now U.S. Pat. No. 8,266,211, issued Sep. 11, 2012, which is a divisional application of U.S. Ser. No. 12/204,648, filed Sep. 4, 2008, now U.S. Pat. No. 8,126,991, issued Feb. 28, 2012, which claims priority to U.S. Provisional Application No. 60/969,884, filed Sep. 4, 2007, the disclosures of each of the above-listed applications are incorporated by reference herein in their entirety for all purposes.

FIELD OF THE INVENTION

The present disclosure relates to controlling data and resource access, and in particular, to methods and systems for facilitating controlled token distribution across systems so as to limit access to and to protect access codes.

BACKGROUND

Storing or transmitting data often presents a risk that a malicious actor may use a device to access and/or use the data in an unauthorized manner. The larger a network grows in which particular data is transmitted, the higher this risk may be. However, such storage and/or transmission is often critical to promoting desired resource usage and/or information distribution. Thus, there exists a problem as to how to accomplish desired information distribution and storage while controlling data access to prevent unauthorized.

SUMMARY

In some embodiments, a system for generating and transmitting tokens for processing communications received from other devices over a network is provided. A communication engine receives a first communication from a second system, the first communication being associated with a credential and having been transmitted by the second system over a wireless network; and transmits a second communication over the wireless network to the second system at a first time, the second communication including a token. The communication also receives a third communication from the second system, the third communication including the token and being received at a second time that is after the first time; and in response to a determination that the token corresponds to the second system, transmits a fourth communication to the second system or to a third system, the fourth communication including an access-enabling code corresponding to an access right for a resource. An authentication engine authenticates the credential, the authentication indicating that an entity associated with the second system is authorized to receive secure tokens for facilitating resource access. A token engine, in response to the authentication, generates the token, the token being generated based on or to correspond with each of: the entity and the resource; identifies that the resource corresponds to the token; and determines that the token corresponds to the second system.

In some embodiments, a computer-implemented method for generating and transmitting tokens for processing communications received from other devices over a network is provided. A first communication is received at a first system, over a network and from a second system. The first communication is associated with a credential; At the first system, the credential is authenticated. The authentication indicates that an entity associated with the second system is authorized to receive secure tokens for facilitating resource access. In response to the authentication, a token is generated at the first system based on or to correspond with each of: the entity and a resource. A second communication is transmitted from the first system and over the wireless network to the second system at a first time, the second communication including the token. A third communication is received at the first system from the second system. The third communication includes the token and is received at a second time that is after the first time. The first system identifies that the resource corresponds to the token and determines that the token corresponds to the second system. In response to determining that the token corresponds to the second system, a fourth communication is transmitted to the second system or to a third system. The fourth communication includes an access-enabling code corresponding to an access right for the resource.

In some embodiments, a computer-program product tangibly embodied in a non-transitory machine-readable storage medium, including instructions configured to cause one or more data processors to perform actions that include all or part of one or more processes or methods disclosed herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
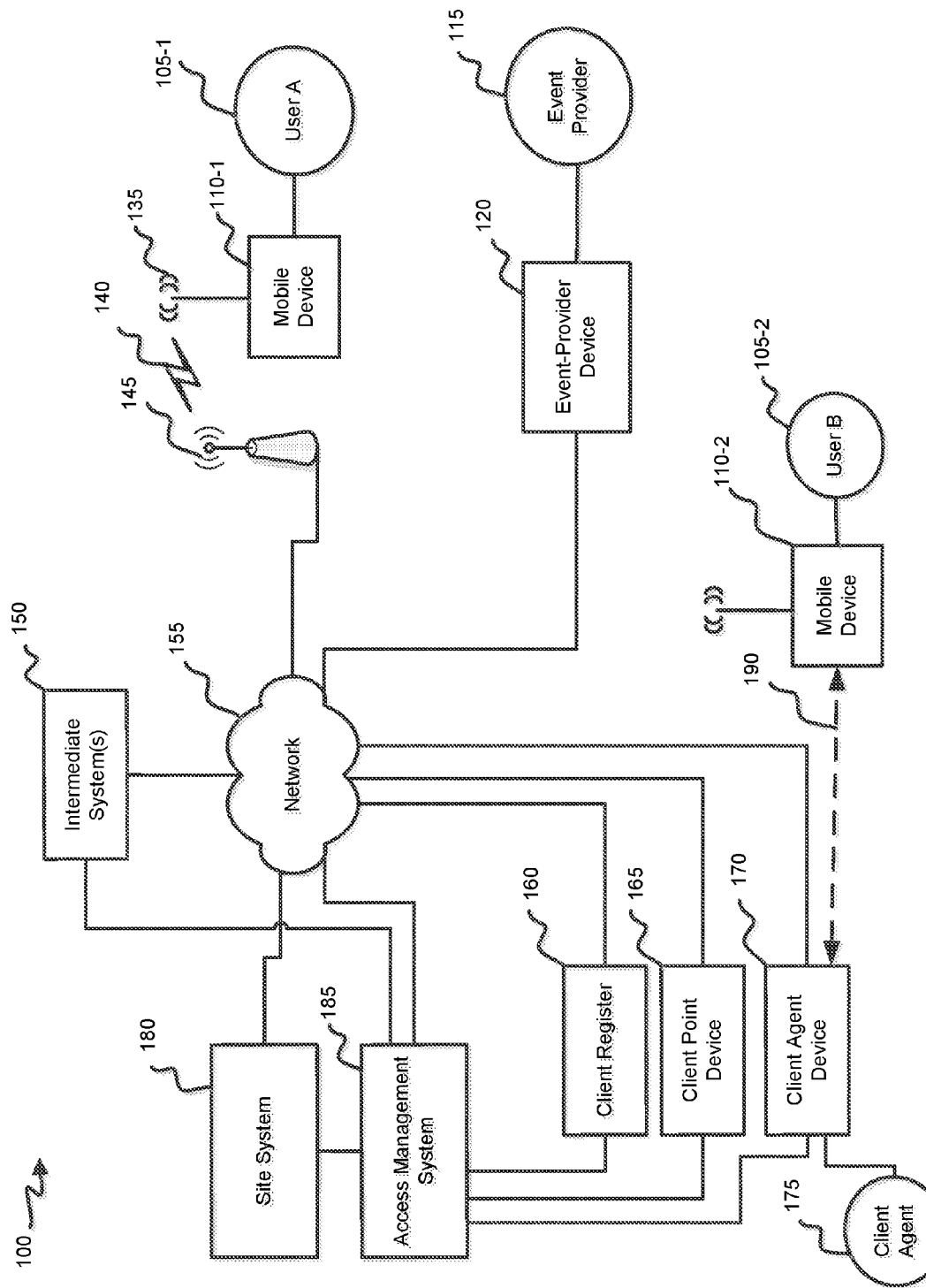
FIG. 1 depicts a block diagram of an embodiment of a resource access-facilitating interaction system.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as a performing entity or an entity operating a venue. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a stadium or concert hall during an event. Mobile device 110-2 may directly interact with a client device (e.g., client agent device 170, client register 160 or client point device 165), which is also located at the stadium or concert hall during the event. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
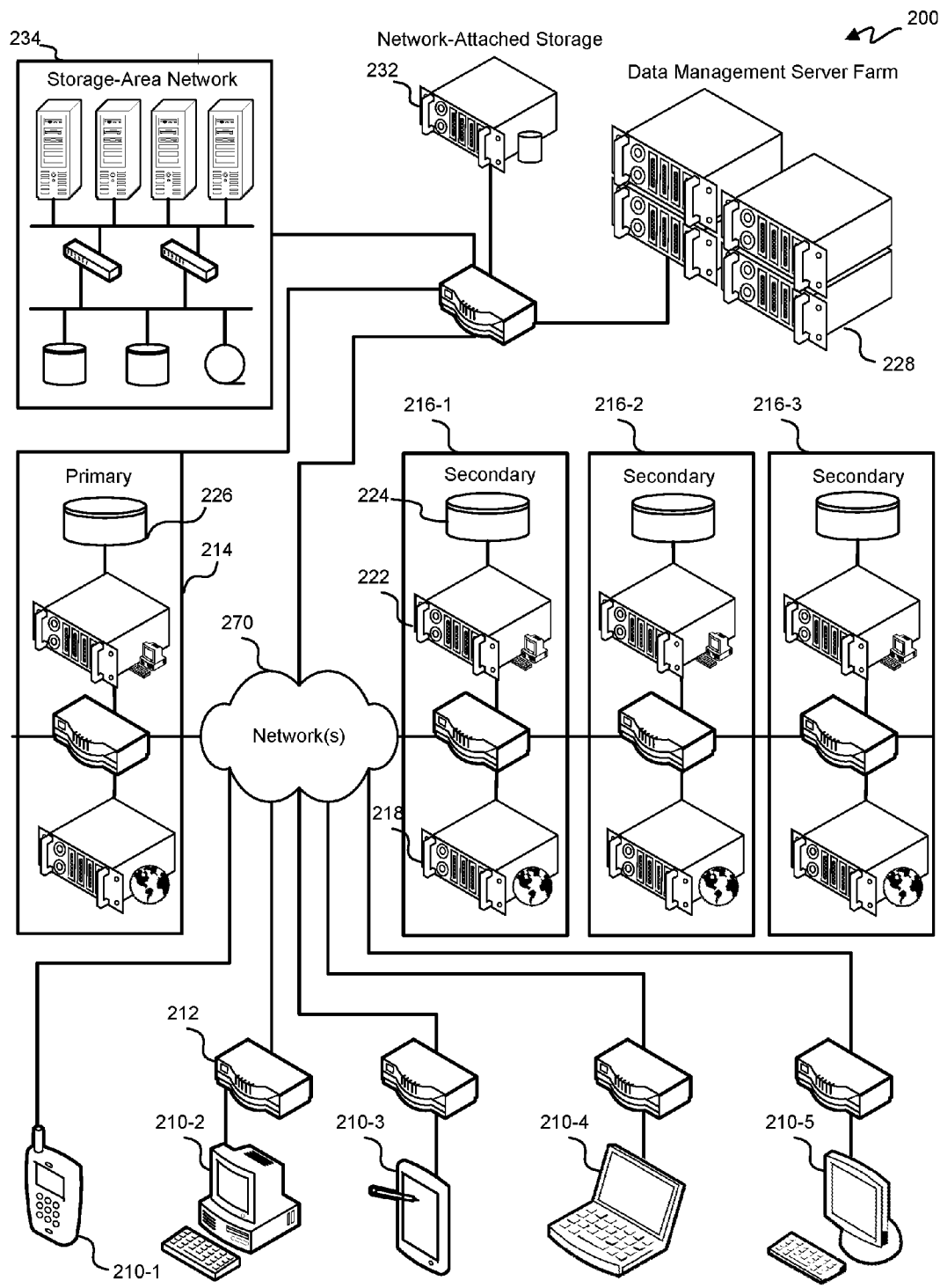
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Such transfer may occur as a result of a sale or fee payment. Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of an account, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
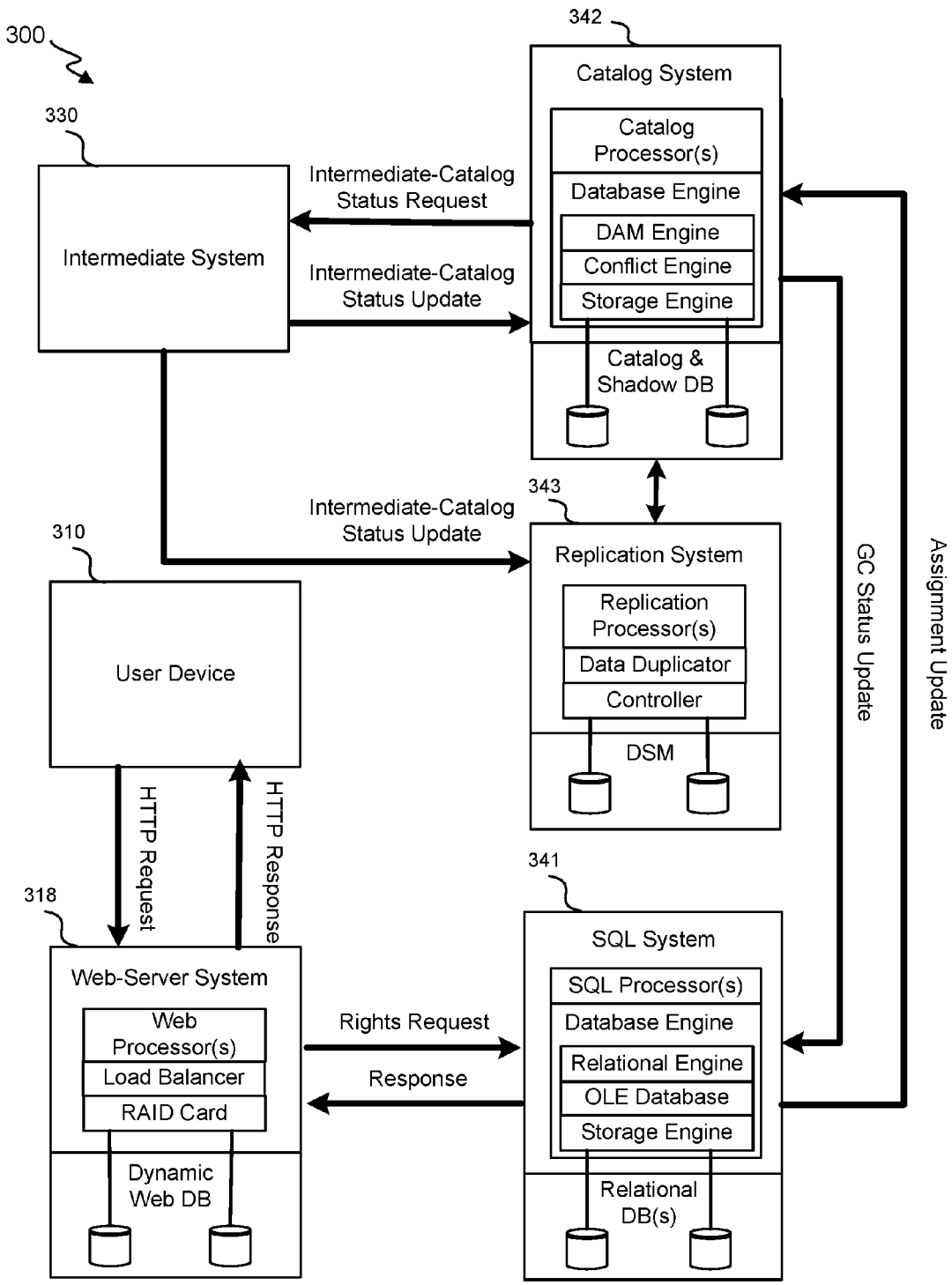
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of resource-access characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls.

The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user account data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, account and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information).

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of datastore queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic web-pages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
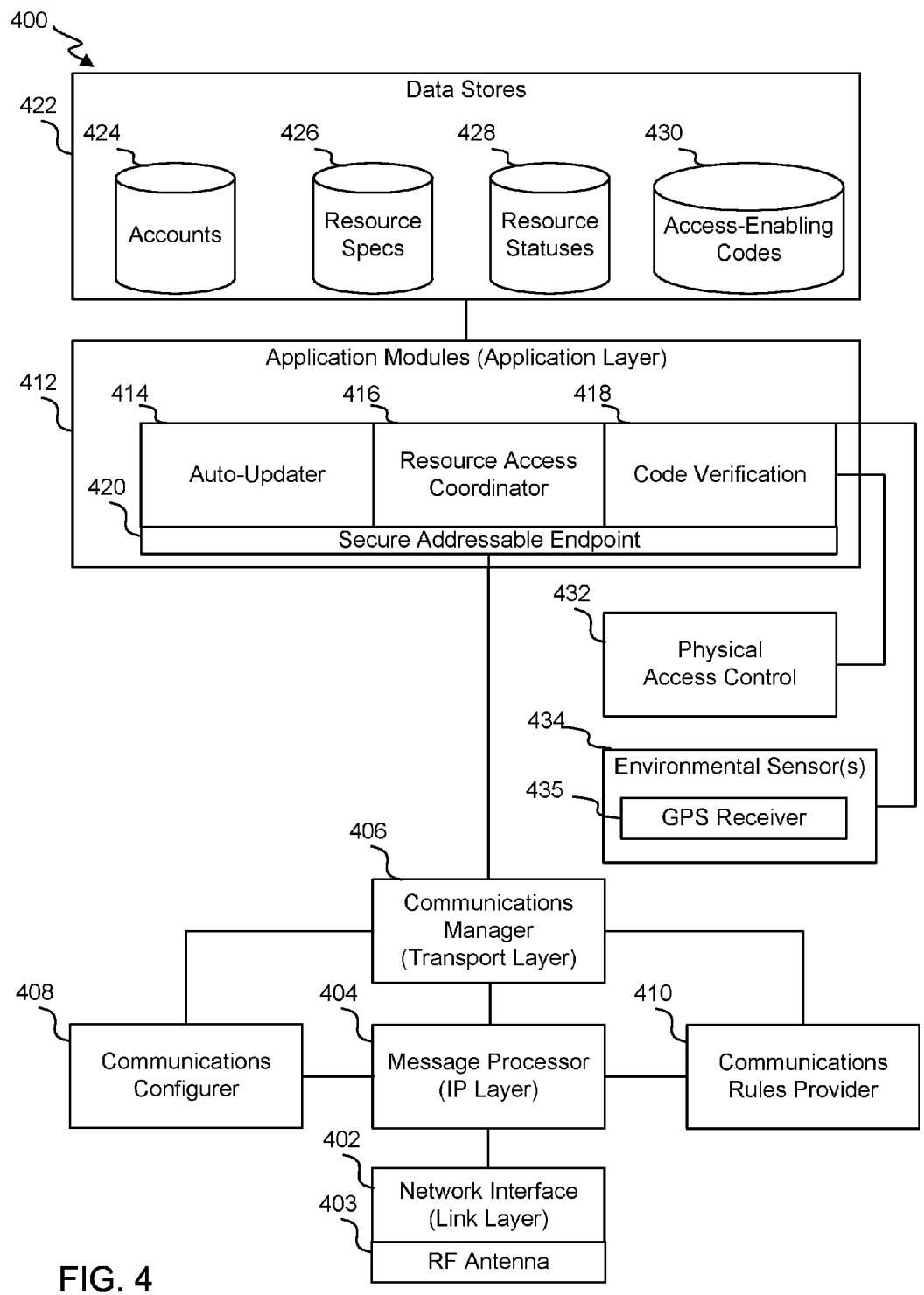
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource (e.g., available seat reservations for a sporting event or concert). As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as an account data store 424, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), purchase data (e.g., reflecting dates, prices and/or items of past purchases) and/or payment data (e.g., credit card number and expiration date or payment account information). The account data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a performing entity, a venue of the event and/or a set of seats (e.g., a chart or list). Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for tickets to a particular event can be unique relative to each other. In some instances, at least part of a code identifies a resource or specification of a resource. For example, for a ticket to a concert, various portions of a code may reflect: a performing entity, resource location, date, section and access-permitted location identifier.

One or more of data stores 424, 426, 428, and 430 can be a relational data store, such that elements in one data store can be referenced within another data store. For example, resource status data store 428 can associate an identifier of a particular ticket with an identifier of a particular entity. Additional information about the entity can then be retrieved by looking up the entity identifier in account data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
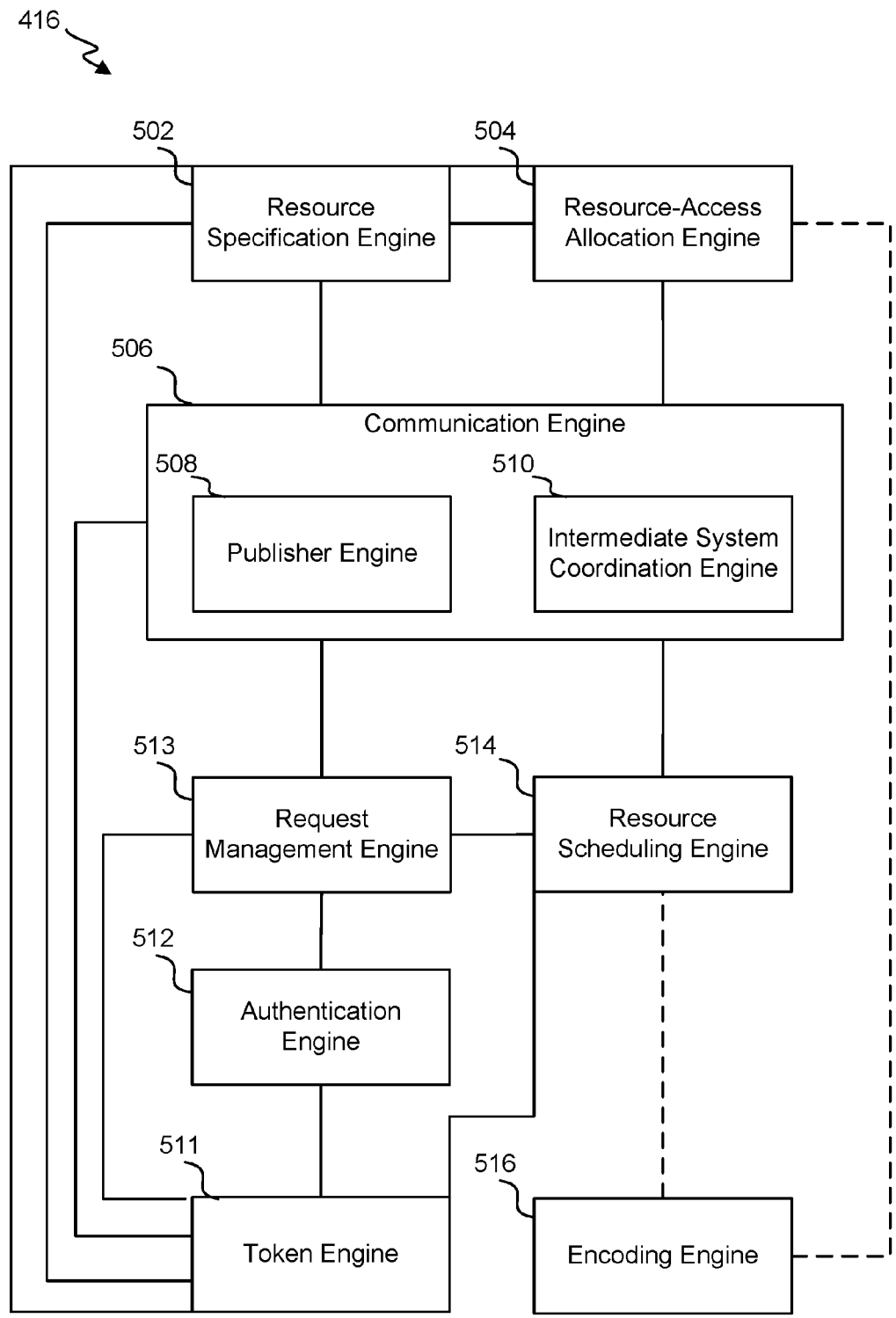
FIG. 5 illustrates example components of resource access coordinator module.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or venue) of the resource. A specification can also or alternatively include one or more parties associated with the resource (e.g., performing acts or teams). Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on fee payment or authorization thereof, an allocated access right can be initially unassociated with particular entities (e.g., users). For example, an allocated right can correspond to one or more access characteristics, such as an processor identifier, a usage time, a memory allocation, a geographic location (e.g., section or seat identifier), and/or a fee. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event and corresponding fees. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for seats in Section 1 may be provided for a first intermediate system to assign, and access rights for seats in Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Resource access coordinator module 416 may use tokens (generated by a token engine 511) to convey information pertaining to a resource. A token may include, for example, a header, payload and signature. The header may identify a type or format pertaining to the payload. In some instances, the header includes a key and/or an identifier of a technique for transforming the payload (e.g., a hashing algorithm or decryption technique), such as one using a token-included key and/or a key previously provided to or provided by another system. The payload may include one or more claims, each of which may include a claim name and a claim value. Token engine 511 may use a transformation technique (e.g., an encryption technique) to transform data elements in the token (e.g., a header, payload, claims and/or signature) into a transformed version thereof. The transformation technique may use a public key and/or a private key, such as a key provided to or provided by another system to which the token is being transmitted.

In some instances, token engine 511 may generate a token that corresponds to one or more access rights. A token can include, for example, data elements (e.g., claim values) that correspond to an identifier of one, more or each of the following: a resource, a characteristic (e.g., location and/or price) of particular access right (or plurality thereof), an access right, and an intermediate system. In one instance, a token includes a data element that includes a storage address. The storage address may identify a location, within a data store, that reflects information pertaining to a resource and/or access right, such as whether a status of an access right indicates that it has been assigned.

In some instances, a token can be used to convey information, such as information that identifies one or more access rights (e.g., that are currently available for a resource). In some instances, a token may be indicative of a preliminary authority, a general authority, a time-limited authority and/or a conditioned authority to assign an access right. For example, in one instance, transmission of a token associated with an access right to a particular system may indicate that the system has an exclusive right to claim (e.g., and/or coordinate assignment of) the access right until an expiration time associated with (e.g., identified in) the token. As another example, transmission of the token may indicate that the system can coordinate an assignment of the associated access right, which will be effected so long as it is the first system to convey coordination of an assignment of the associated access right to a central system.

Tokens may be transmitted to intermediate systems upon authenticating the intermediate systems. For example, an intermediate system may be initially authenticated (e.g., by an authentication engine 512) based on an evaluation of login credentials, an IP address, and/or a device identifier. Such authentication may occur in response to receiving a request communication from the intermediate system that identifies a resource and/or prior to (or separate from) any such request.

Upon authenticating the intermediate system, a token associated with the resource (e.g., and, in some instances, one or more access rights) may be transmitted to the intermediate system. Any subsequent communication from the intermediate system that requests assignment of an access right for the resource may include the token, which may have an effect of indicating that an authentication corresponding to a proposed assignment was already performed and/or may identify details pertinent to the assignment (e.g., as the token can be indicative of a particular resource).

A token may, or may not, be specific to a given intermediate system. For example, a single token corresponding to a given resource (e.g., and, in some instances, one or more access rights) may be transmitted to multiple intermediate systems. A particular intermediate system may then communicate with a user device so as to indicate that an access right for the resource is available, and the user device may send a communication requesting assignment of the access right. In various instances (e.g., depending on a type of token transmitted to an intermediate system and/or to how many intermediate systems a token corresponding to a resource or access right was transmitted), it may or may not be indicated that a single intermediate system has control of coordinating an assignment to an access right for a resource. For example, exclusive assignment control may be provided as a result of an intermediate system having purchased the access right and/or committed to purchasing the access right if it is not assigned to a user.

When such control is not exerted, intermediate system may send a communication that includes the token (e.g., so as to identify a resource and/or access right and/or to be indicative of a previous authentication) back to an access management system to confirm that an access right has not yet been assigned and/or request assignment. In some instances, the communication may identify a user associated with the user device and/or user device. When such control is exerted, in various instances, intermediate system may (but need not) still send a communication to an access management system that includes the token that indicates that an access right is being assigned and/or that include assignment data (e.g., an identifier of a user and/or user device).

Thus, either via a presentation facilitated by publisher engine 508 (e.g., via a web site or app page) or via communication with an intermediate system, a request for assignment of an access right can be received. A request management engine 513 can process the request. Processing the request can include determining whether all other required information has been received, such as user-identifying information (e.g., name), access-right identifying information (e.g., identifying a resource and/or resource-access characteristic) user contact information (e.g., address, phone number, and/or email address), and/or user device information (e.g., type of device, device identifier, and/or IP address).

When all required information has not been received, request management engine 513 can facilitate collection of the information (e.g., via a webpage, app page or communication to an intermediate system). Request management engine 513 can also or alternatively collect payment information, determine that payment information has been received, obtain authorization of payment, determine that payment has been authorized (e.g., via an intermediate system), collect payment, and/or determine that payment has been collected. For example, publisher engine 508 may receive a credit card number and expiration date via a webpage, and request management engine 513 can request authorization for an amount of the requested access rights. In some instances, payment assessments are performed subsequent to at least temporary assignments of access rights. In some instances, request management engine 513 retrieves data from a user account. For example, publisher engine 508 may indicate that a request for an access right has been received while a user was logged into a particular account. Request management engine 513 may then retrieve, for example, contact information, device information, preferences and/or payment information associated with the account from account data store 424

When a request is received from an intermediate system—in various instances—information collected and assessed may correspond to an entity associated with the intermediate system or a user associated with a user device with which the intermediate system was in contact. Similarly, if a request is received from a user device but was made in response to an interaction between the user device and an intermediate system, information collected and accessed may correspond to an entity associated with the intermediate system. For example, a request communication may include a token uniquely associated with a particular intermediate system. Request management engine 513 may then retrieve account information corresponding to the particular intermediate system. If an access right is assigned, it may be assigned to the intermediate system (which may assign it to a user) or to a user identified by the intermediate system.

In some instances, request management engine 513 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests, purchase history departing from a human profile).

Upon determining that required information has been received and request-processing conditions have been met, request management engine 513 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 513 can facilitate a communication exchange by which access right characteristics matching the request are identified, and a user is allowed to select particular rights. As another example, request management engine 513 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining payment authorization and/or user confirmation) and/or to change a status of the access right(s) to indicate that they have been assigned (e.g., immediately, upon receiving payment authorization or upon receiving user confirmation). Such assignment indication may associate information about the user (e.g., user name, device information, phone number and/or email address) and/or assignment process (e.g., identifier of any intermediate system and/or assignment date and time) with an identifier of the access right(s). Resource scheduling engine 514 may further send a communication to one or more intermediate systems (e.g., not associated with a request being processed) to indicate a change in the status of the access right and/or that a previously provided token associated with the access right has expired.

For individual assigned access rights, an encoding engine 516 can generate an access-enabling code (or "access code"). The access-enabling code can include, for example, an alphanumeric string, a text string, a number, a graphic, a barcode (e.g., a 1-dimensional or 2-dimensional barcode), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a ticket document with a barcode may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment and/or to an intermediate system facilitating the assignment and/or having transmitted a corresponding assignment request. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
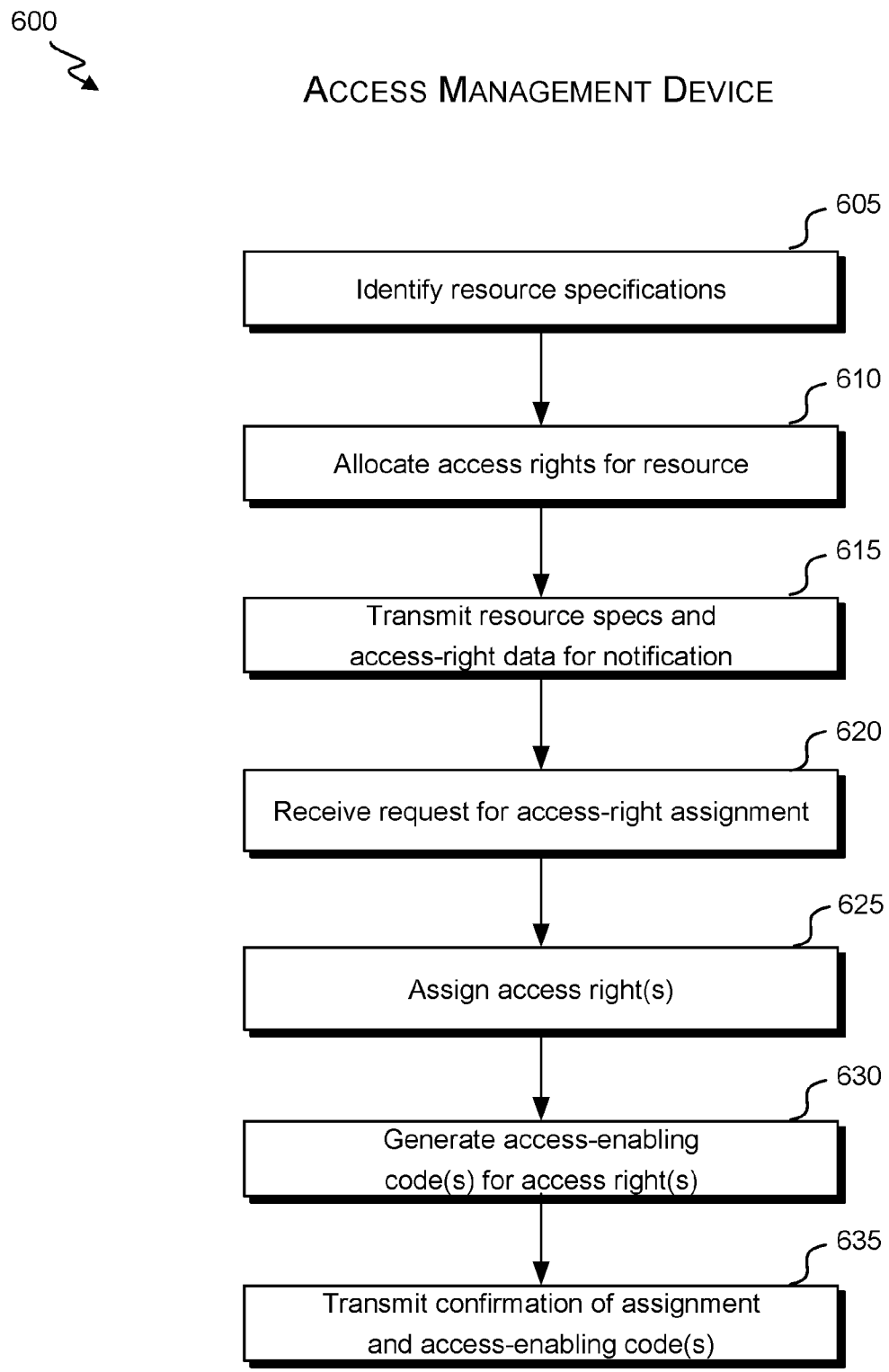
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location (e.g., seat) assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 513 receives a request for one or more access rights to be assigned to a user. The request can, for example, identify particular access rights and/or access parameters. The request can include or be accompanied by other information, such as identifying information. In some instances, the access management system can use at least some of such information to determine whether a fee for the access rights has been authorized. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied, fee provision and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
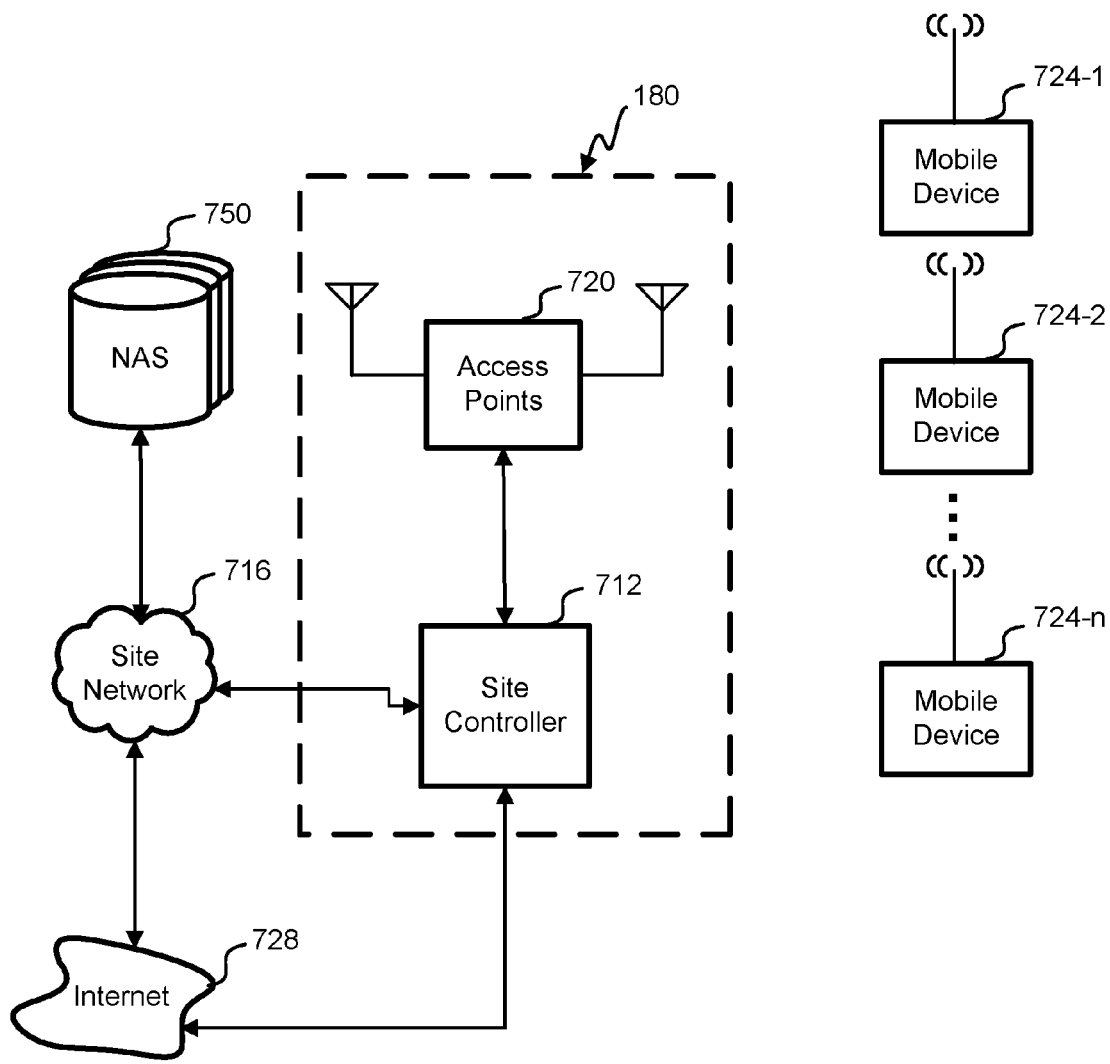
FIGS. 7A and 7B show embodiments of site systems in relations to mobile devices.

Referring to FIG. 7A, an embodiment of a site system 180 is shown in relation to mobile devices 724-n, Network Attached Storage (NAS) 750, site network 716 and the Internet 728. In some embodiments, for attendees of a live event or concert, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about attendees, videos, pictures, music, trivia information, etc.) held by NAS 750. Additionally, as described herein, content can be gathered from attendees both before and during the event. By connecting to site network 716, mobile device 724 can send content for use by site system 180 or display content received from NAS 750.

Figure 7B:
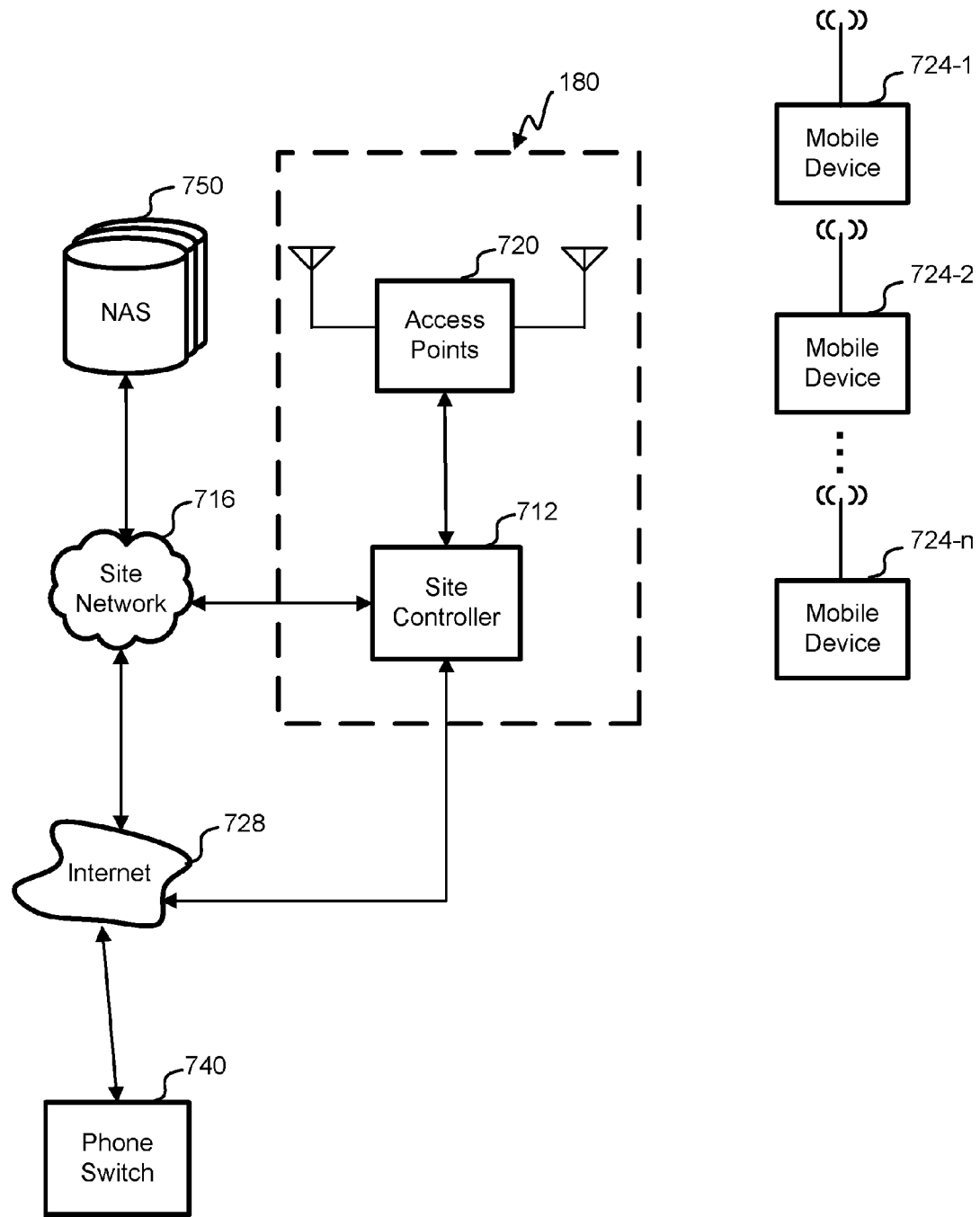

Referring to FIG. 7B, another embodiment of a site system 180 is shown in relation to mobile devices 724-n, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
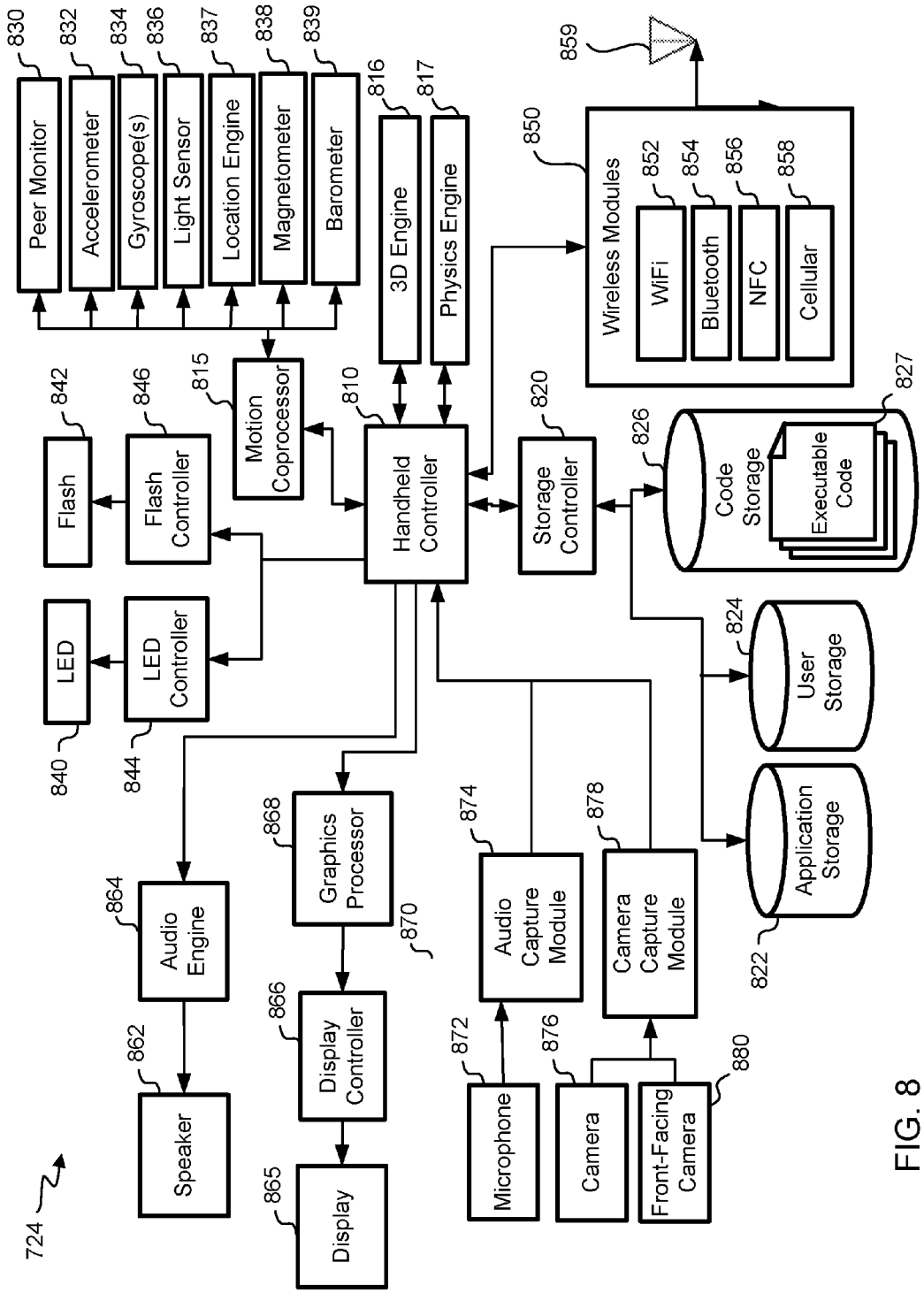
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-toaudio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
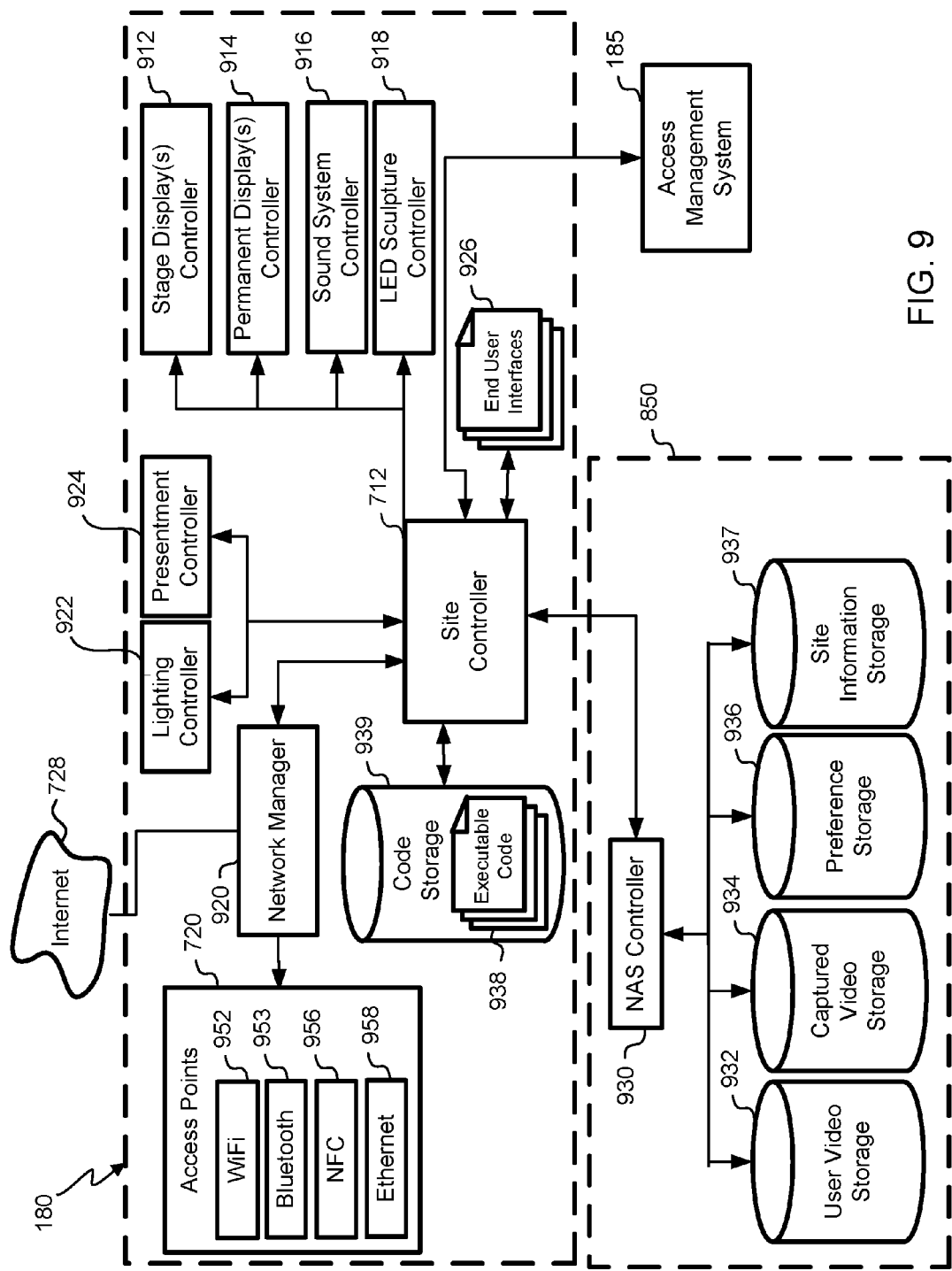
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of an event venue. A broad variety of venue features can be controlled by different embodiments, including: permanent lights (e.g., with lighting controller 922), stage lights (e.g., with presentment controller 924), stage display screens (e.g., with stage display(s) controller 912), permanent display screens (e.g., with permanent display(s) controller 914), and the venue sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., events, seat maps, attendee information, geographic location of destinations (e.g., concessions, bathrooms, exits, etc.), as well as 3D models of site features and structure.

In some embodiments, tokens are transmitted across systems, which can inhibit unauthorized access to and use of access codes. Use of tokens may be particularly advantageous when communicating with one or more secondary assignment management systems and/or conveying information pertaining to access rights prior to assignments. FIGS. 10A-10D illustrate examples of communication exchanges between systems involving identifications of tokens and access codes.

Figure 10A:
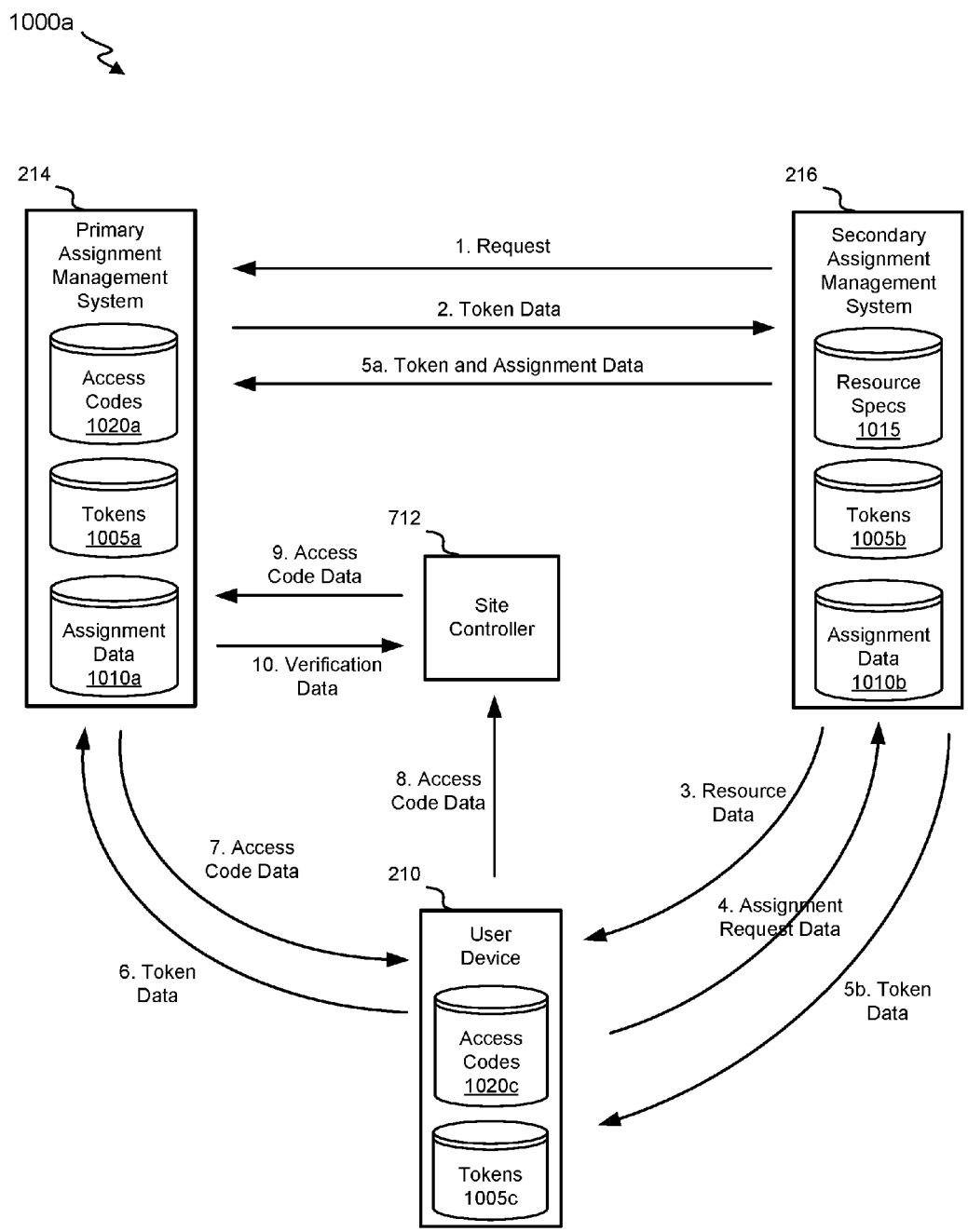
FIGS. 10A-10D illustrate examples of communication exchanges between systems involving identifications of tokens and access codes.

In FIG. 10A, a first communication is transmitted from a secondary assignment management system 216 (e.g., which may correspond to an intermediate system) to a primary assignment system 214 (e.g., which may correspond to an access management system and may include one or more components depicted or described herein, such as those depicted in FIG. 4 and/or FIG. 5). The first communication includes or is indicative of a request. In some instances, the first communication may include an identifier of a resource, a characteristic for accessing the resource (e.g., a section), and/or an identifier associated with an entity associated with the secondary assignment management system 216 (e.g., a login name and/or password or metadata including an IP address and/or device identifier).

Primary assignment management system 214 may process the request to determine whether to authenticate secondary assignment management system 216 and/or an entity associated therewith. The authentication may include, for example, determining whether a credential (e.g., a username and/or password, IP address, and/or device identifier) included in or otherwise associated with the request is valid and/or matches a credential in a local or remote data store.

Upon a authenticating secondary assignment management system 216 and/or an entity associated therewith, primary assignment system may generate or retrieve a token associated with a resource. The token can include and/or can be an alphanumeric string, which may (but need not) be or configured to be transformed via a transformation technique (e.g., an encryption technique). In various instances, the token may be associated with a particular access right, a particular set of access rights, an resource-access characteristic (e.g., and, in some instances, any access rights associated therewith), and/or a resource iteration (e.g., corresponding to a time and/or location). For example, primary assignment management system 214 may identify a set of access rights with an unassigned status (e.g., by look-up at a local or remote assignment data store 1010a). One or more tokens may be generated to correspond to some or all of these access rights. In various instances, a given token is generated and/or stored so as to uniquely correspond to a particular secondary assignment management systems.

In one instance, primary assignment management system 214 identifies set of access rights for a resource and associates different portions thereof with different secondary assignment management systems. A set of tokens transmitted to the secondary systems can then correspond to different secondary systems and to different access rights. In one instance, primary assignment management system 214 associates overlapping portions of the set with different secondary assignment management systems or associates the entire set with each secondary assignment management systems. One or more tokens transmitted to different secondary assignment management systems may, in some instances, still differ from each other (e.g., due to being associated with different secondary systems), or they may be the same (e.g., as a result of corresponding to one or more same access rights and resource).

Therefore, in some instances, a set of tokens is generated and stored at a local or remote token data store 1005a managed by and/or accessible to primary assignment management system 214. Each token in the set of tokens may be different than the rest, and each token may have a particular correspondence to one or more resources, access rights, resource-access characteristics, secondary assignment management systems, and so on.

A token may correspond to (for example) an indication that a system or entity provided with the token from primary assignment management system 214 is entitled to assign a corresponding access right for a resource to a user. Such entitlement, in some instances, is conditioned, such as one that indicates that an instruction from a token-associated system or entity to assign an access right to a user will be accepted so long as the access right has not already been assigned to another user (e.g., via a different secondary assignment management system or entity). As another example, the instruction may be accepted so long as payment from the token-associated system or entity or the user is collected or authorized (e.g., via provision of payment information and/or retrieval of such from an account and/or a successful transaction communication with a payment management entity).

A token may additionally or alternatively correspond to (for example) an indication that a subsequent communication or communication session that includes the token need not be fully authenticated (or authenticated at all). A token, in some instances, may be time-limited. For example, a token may include and/or represent an expiration date and/or time, after which the token is no longer valid. As another example, a communication sent to a secondary assignment management system that includes the token may also include an expiration date and/or time.

Upon authentication of secondary assignment management system 216, primary assignment management system 214 transmits token data that includes a token to secondary assignment management system 216. Secondary assignment management system 216 may then store the token in a token data store 1005b managed by and/or accessible to secondary assignment management system 214. It will be appreciated that, in various instances, this authentication may be particularly tied to a single token delivery or a general authentication. For example, a secondary assignment management system 216 may send an initial request communication for all access rights corresponding to resources at a given location. Primary assignment management system 214 may perform an authentication and then send tokens for particular resources upon detecting new access-right allocations corresponding to the given location.

Each token stored at token data store 1005b may represent, identify or otherwise be associated with a given resource. Secondary assignment management system 216 may also manage and/or have access to a resource specification data store 1015. Such specifications may be collected from, for example, primary assignment management system 214, other systems, and/or web crawling. A resource specification may include text, graphics, or a video. A specification may identify, for example, one or more performing entities, a location of the resource, and/or a location associated with one or more access rights relative to a performing entity.

Secondary assignment management system 216 can transmit resource data to one or more user devices. The resource data can include one or more resource specifications and may be transmitted, for example, in response to receiving an electronic query with one or more parameters corresponding to the resource. The resource data may be provided via, for example, a webpage. In some instances, in addition to transmitting the resource data, secondary assignment management system 216 transmits data corresponding to one or more access rights for the resource, such as one or more access rights corresponding to a token and/or one or more access rights detected by secondary assignment management system 216 (e.g., via assignment data from an assignment data store 1010b managed by and/or accessible to secondary assignment management system 216 and/or via communicating with primary assignment management system 214) as having an available status.

A user device 210 may transmit an assignment request communication to secondary assignment management system 216. The assignment request may identify and/or be indicative of a resource, particular access right and/or resource-access characteristic. The assignment request communication may be transmitted in response, for example, to presentation of some or all of the resource data. For example, a user may use a webpage to submit a query. Secondary assignment management system 216 may retrieve resource specifications pertaining to the query and transmit corresponding resource data to user device 210 via the webpage. A user may then select an access-right representation and/or request indication to initiate transmission of the assignment request communication.

The assignment request communication (or a different corresponding communication) may include information pertaining to the user and/or user device. Secondary assignment management system 216 may determine whether all required information has been provided and whether local to and/or managed by secondary assignment management system 216 indicates that a status of a requested access right (or an access right corresponding to a resource and/or resource-access characteristic associated with the assignment request communication) remains unassigned.

Secondary assignment management system 216 can then retrieve a token from token data store 1005*b* that corresponds to an access right associated with the request (e.g., identified in the request and/or having an resource-access characteristic identified in the request). The token can be transmitted to one or more systems and/or devices. For example, secondary assignment management system 216 can transmit a communication that includes the token back to primary assignment management system 214 to indicate that an access right corresponding to the token is to be assigned to a particular user or has been assigned to a particular user (e.g., depending on which system has control of issuing such assignments). In some instances, the communication may include or may have an effect of being an instruction to change a status of the access right in assignment data store 1010*a* and/or to associate an identifier of the access right with an identifier of the particular user in assignment data store 1010*a*. Thus, the communication may (but need not) include assignment data, which can identify a user, a user device and/or an access right.

Upon receiving the communication from secondary assignment system 216, primary assignment management system 214 may update token data store 1005*a* to indicate that the token and/or any other token associated with a same access right identified as being assigned is expired. Primary assignment management system 214 may transmit an expiration communication to one or more other secondary assignment management systems (e.g., to which a same or different token associated with the same access right was previously provided) to indicate that the token has expired. Primary assignment management system 214 may further update assignment data store to change a status of an access right to "assigned" and/or to associate it with an identifier of one or more of: second assignment management system 216, an identified user, user device 210 and/or the token.

Secondary assignment management system 216 can further update assignment data store 1010*b* to indicate that a particular access right is assigned, not available and/or assigned to a particular user. Secondary assignment management system 216 may also update token data store 1005*b* to remove the token and/or to indicate that it has expired or been used.

Secondary assignment management system 216 can also transmit the token back to user device 210 (e.g., via a website, app page, email or SMS message). The token can be transmitted along with an indication that a corresponding access right is being assigned. User device 210 can then store the token in a token data store 1005*c* that is local to and/or accessible to the device.

Subsequently, user device 210 may retrieve the token and transmit it to primary assignment management system 214 so as to request an access code for the corresponding access right. The token retrieval and/or transmission may occur, for example, upon detecting a user input corresponding to a request for the access code, detecting a site controller 712, detecting (e.g., via tracking GPS coordinates) that user device 210 is within a prescribed geographical area associated with the resource, detecting that a time threshold (e.g., that is a defined time before a resource-associated time) has elapsed and/or detecting a request from a device or system (e.g., site controller 712) for an access code.

Depending on the embodiment, primary assignment management system 214 may, or may not, verify that the token corresponds with a user and/or user data identified in association with the token in assignment data store 1010*a*. Primary assignment management system 214 may then retrieve or generate an access code that corresponds to the token. The access code can include one previously stored at or store, subsequent to real-time generation thereof, at an access code data store 1020*a* managed by and/or local to primary assignment management system 214. The access code can include, for example, a one-, two-, three- or four-dimensional code (e.g., one that changes in time).

User device 210 may store the access code at an access code data store 1020*c* local to and/or accessible to the user device. Immediately or subsequently, user device 210 may also transmit the access code to a site controller 712. The transmission of the access code to site controller 712 may occur (for example) in response to detecting the site controller, in response to receiving a request from site controller 712 for the access code and/or in response to detecting user input corresponding an instruction to transmit the access code. In some instances, user device 210 may—in a same or different communication—transmit additional information, such as an identifier of user device 210 and/or an identifier of an associated user.

Site controller 712 can communicate with primary assignment management system 214 to verify that the access code is valid and is applicable to a given circumstance. Specifically, site controller 712 may transmit the access code to primary assignment management system 214 along with other information, such as (for example) an identifier of user device 210, an identifier of a user, an identifier of a resource, or a location characteristic.

Primary assignment management system 214 may determine whether the access code is valid by, for example, identifying whether the code exists in access code data store 1020*a*, whether the code exists in access code data store 1020*a* and is associated with one or more given statuses (e.g., assigned and unredeemed), and/or whether the code conforms to a particular pattern. Primary assignment management system 214 may further determine whether the access code corresponds with information in access code data store 1020*a* that is consistent with other information transmitted by site controller 712, such as an identifier of a user device, a resource, a user or a location. Upon determining that the access code is valid (e.g., and applicable to a given circumstance, as estimated based on an information consistency analysis), primary assignment management system 214 may change a status of the access code in access code data store 1020*a* to indicate that it has been used, and transmit verification data back to site controller 712 indicating that the access code is verified. If it is determined that the access code is not valid and/or not applicable to a given circumstance, primary assignment management system 214 can transmit verification data back to site controller 712 indicating that the access code is not verified.

Site controller 712 can use a verification communication to (for example) determine whether to unlock a gate of a resource and/or to control a presentation. For example, an indication that an access code is verified can cause a gate to unlock or a notification to be presented that an access code is verified.

Figure 10B:
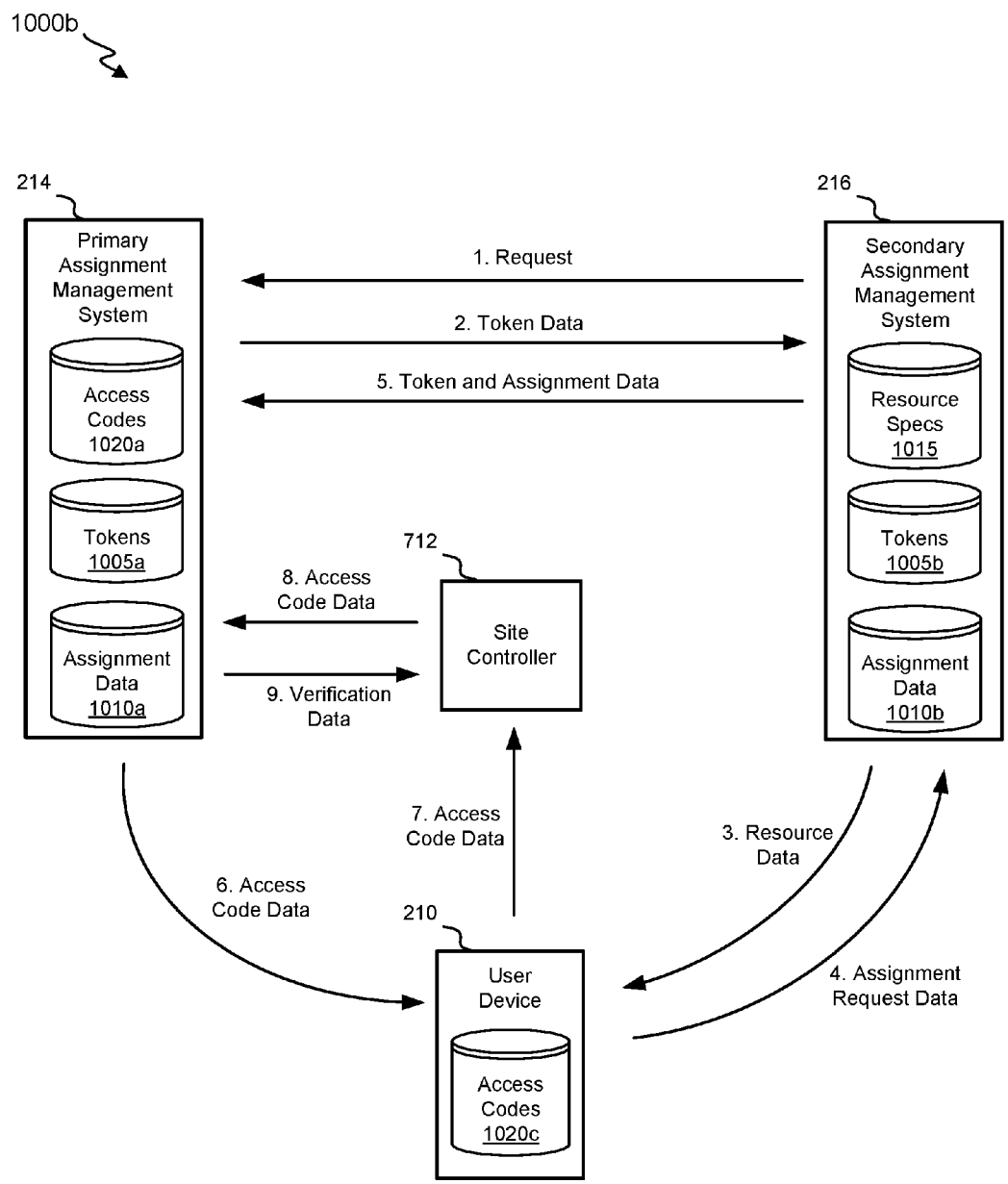

In FIG. 10B, initial communications parallel those depicted in FIG. 10A. However, in this instance, secondary assignment management system 216 does not transmit token data to user device 210. Rather, assignment data transmitted from secondary assignment management system 216 to primary assignment management system 214 that includes an identifier of user device 210 or an associated user.

Primary assignment management system 214 can then send access code data that includes an access code that corresponds to the token. For example, the assignment data may identify user device 210, and the access code can then be sent to user device 210. As another example, the assignment data may identify a user. User device 210 (which may be a same or different user device from the one used to request an assignment) may then detect association with a user and transmit a communication to primary assignment management system 214 that identifies the user (e.g., via a username and/or password, account identifier, etc.). As yet another example, secondary assignment management system 216 may provide user device 210 with a code (e.g., that is also provided to primary assignment management system 214 or was provided by primary assignment management system 214). A communication from user device 210 (which may be the same or different user device from one used to request an assignment) may then indicate that the user device corresponds to the user.

The access code data can be transmitted to user device 210 (for example) upon receiving (e.g., immediately upon receiving) the assignment data, upon detecting that a time threshold defined based on a resource-associated time has passed, and/or upon receiving a request or other communication from user device 210. Subsequently, user device 210 can transmit the access code to site controller 712, which can communicate with primary assignment management system 214 to determine whether the code is verified, as in FIG. 10A.

Figure 10C:
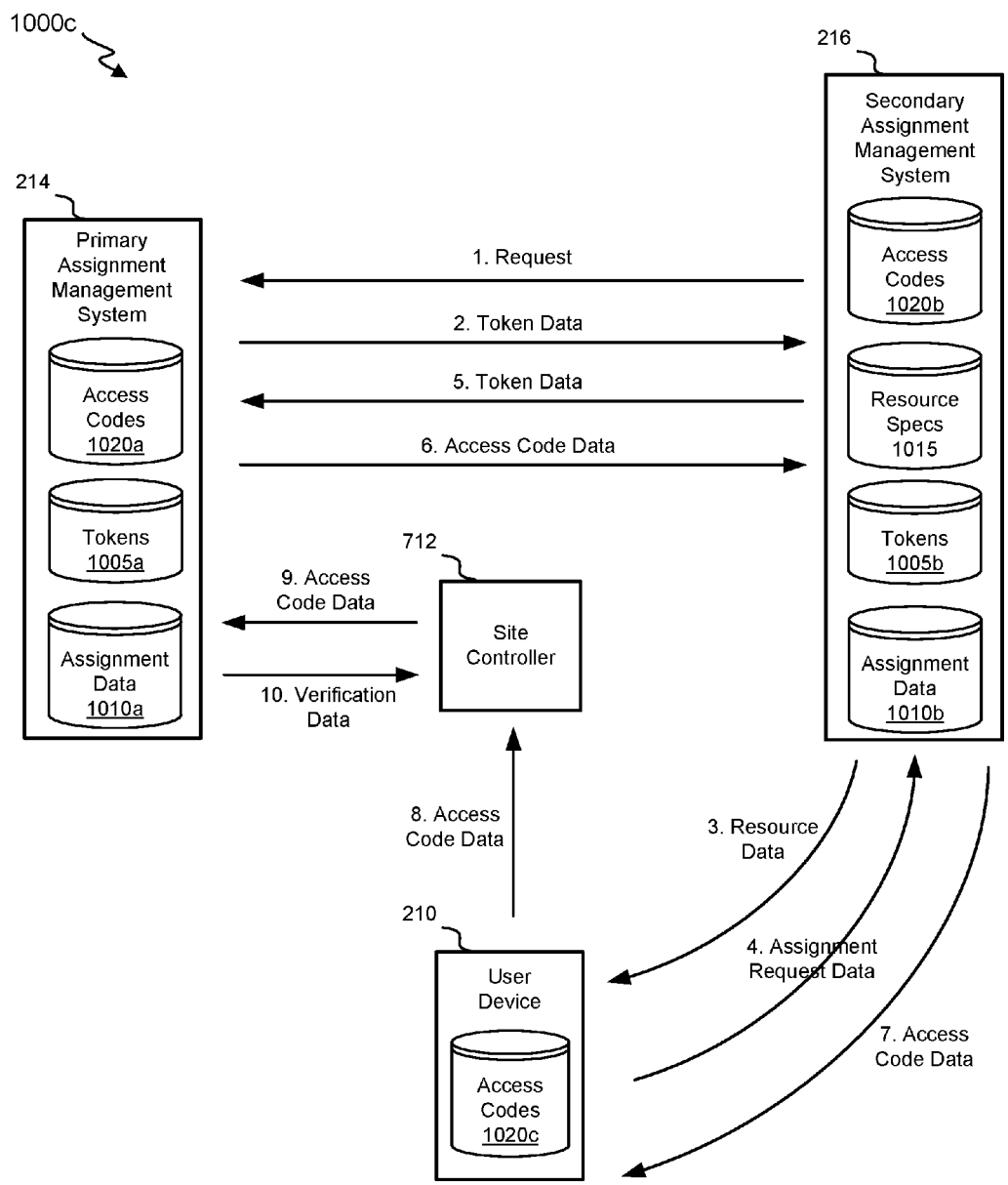

In FIG. 10C, initial communications parallel those depicted in FIG. 10A. However, in this instance, secondary assignment management system 216 provides user device 210 with an access code (e.g., as opposed to primary assignment management system 214 providing such a code). More specifically, in response to receiving token data from secondary assignment management system 216, primary assignment management system 214 provides secondary assignment management system 216 with a corresponding access code. The access code may be provided, for example, immediately, at a defined delay, or upon detecting that a time threshold defined based on a resource-associated time has passed.

Secondary assignment management system 216 may store the access code in an access code data store 1020b that is local and/or accessible to secondary assignment management system 216. Secondary assignment management system 216 can then transmit the access code to user device 210. The access code can be transmitted to user device 210, for example, immediately, at a defined delay, or upon detecting that a time threshold defined based on a resource-associated time has passed. Thus, in this context, one or both of primary assignment management system 214 and/or secondary assignment management system 216 can control when a user device has receives an access code. Subsequently, user device 210 can transmit the access code to site controller 712, which can communicate with primary assignment management system 214 to determine whether the code is verified, as in FIG. 10A.

Figure 10D:
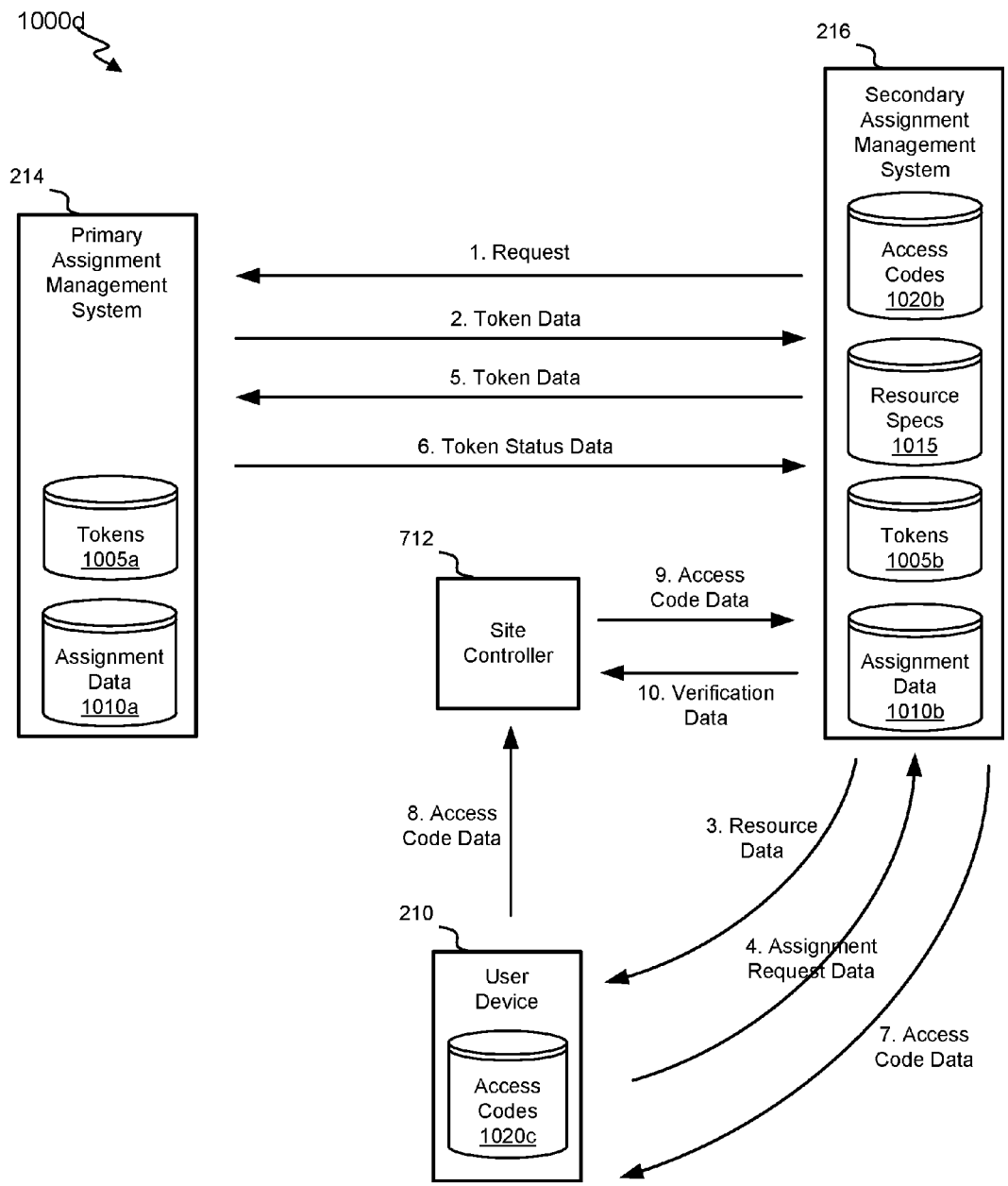

In FIG. 10D, many communications parallel those depicted in FIG. 10A-C. However, in this instance—while primary assignment management system 214 manages tokens, it does not manage access codes. Rather, secondary assignment management system 216 or a remote system can manage access codes (e.g., via an access code data store 1020b).

In response to receiving an assignment request, secondary assignment management system 216 can communicate token data to primary assignment management system 214, which can ensure (for example) that a status of the token is valid. For example, a token may have become invalid due to another system having used the same or a corresponding token and/or the token having been used a threshold number (e.g., a specified number that is more than one) of times. Primary assignment management system 214 can convey the status of the token to secondary assignment management system 216.

When a status indicates that a token is still valid and represents an ability to assign an access code, secondary assignment management system 216 may then generate or retrieve an access code that corresponds to the token. That access code can be transmitted to user device 210, for example, immediately, at a defined delay, or upon detecting that a time threshold defined based on a resource-associated time has passed. When site controller 712 receives the access code, a verification communication exchange can be conducted between site controller 712 and secondary assignment management system 216.

Figure 11:
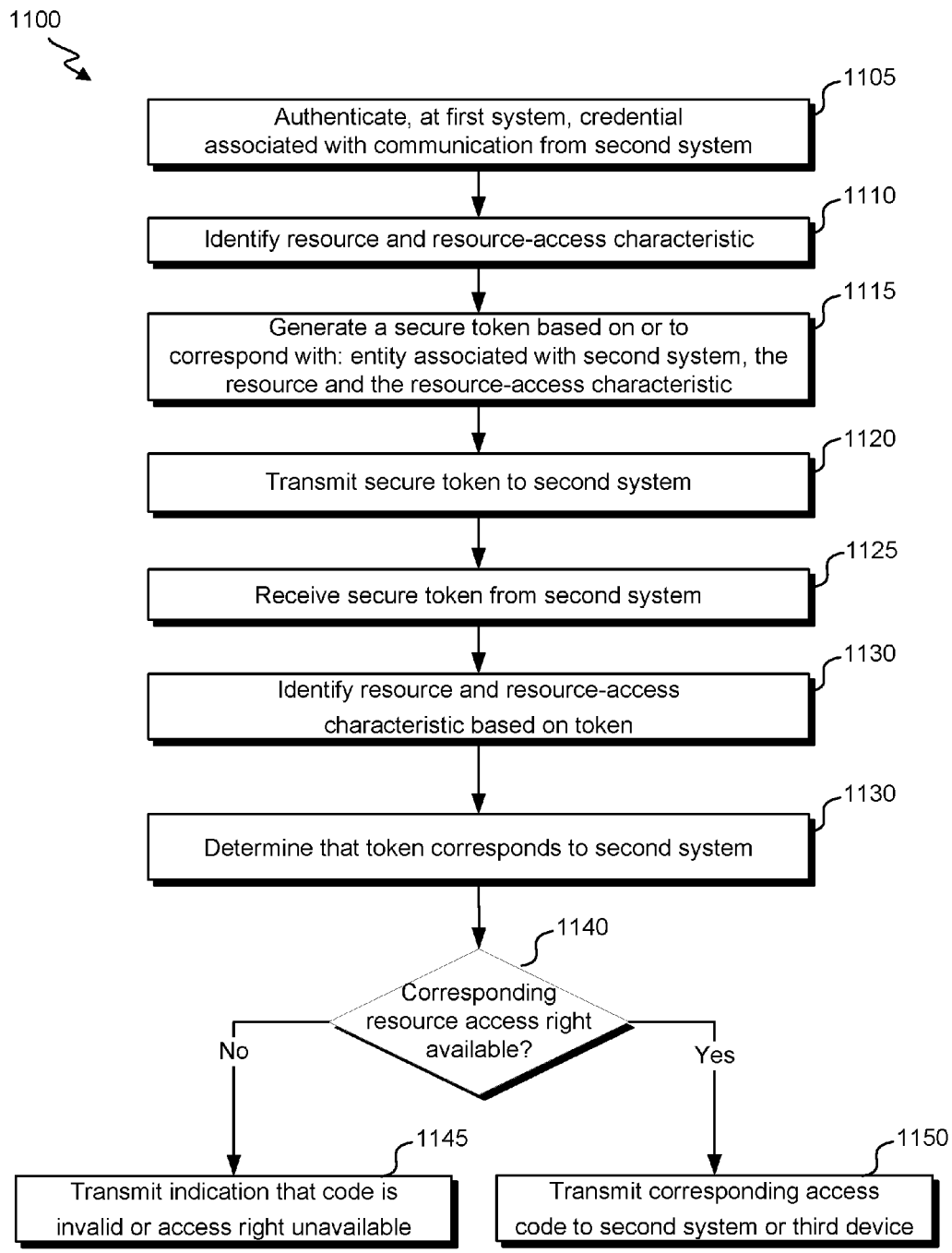
FIG. 11 illustrates a flowchart of an embodiment of a process for conditionally transmitting access codes.

FIG. 11 illustrates a flowchart of an embodiment of a process 1100 for conditionally transmitting access codes. Some or all of process 1100 may be performed (for example) by an access management system and/or primary assignment management system. In some instances, process 1100 is performed in a distributed manner, with different systems (e.g., a primary assignment management system and a secondary assignment management system) performing at least part of process 1100.

Process 1100 begins at block 1105, where a credential is authenticated at a first system (e.g., a primary assignment management system). The credential is one associated with a communication received at the first system from a second system (e.g., a secondary assignment management system). The credential can include one, for example, included in the communication and/or in metadata associated with the communication. The credential may pertain to an identifier of the second system and/or associated entity. The credential may include, for example, a name, alphanumeric code, or email address. The credential may correspond to data automatically detected at the second system and/or data corresponding to input provided at the second system. It will be appreciated that the second system or another system (e.g., a third system) can be configured to provide one or more access-enabling codes to data requesting systems. However, if the third system, for example, is determined to be unreliable, a status can be stored indicating such, and the third system can be prohibited from providing or assigning the one or more access-enabling codes to data requesting systems. See U.S. Ser. No. 14/617,765, filed on Feb. 9, 2015, the disclosure of which is hereby incorporated by reference in its entirety for all purposes. It will also be appreciated that an indication can be stored that indicates how the one or more access-enabling codes are to be allocated to at least two different distribution channels (e.g., systems). See U.S. Ser. No. 12/435,972, filed on May 5, 2009, the disclosure of which is hereby incorporated by reference in its entirety for all purposes.

Authenticating the credential may include, for example, determining that the credential matches or otherwise corresponds to one in a credential or account data store. The credential or account data store can include one that is maintained so as to represent or include credentials associated with systems or entities for which (for example) a prescribed payment has been received, a human-authorization technique has been passed, an electronic agreement has been accepted (e.g., committing to purchase a specified number or requested access rights), and so on.

At block 1110, a resource and an resource-access characteristic are identified. The resource and/or resource-access characteristic may be ones specified in the communication and/or may be identified automatically (e.g., as ones corresponding to an above-threshold number of percentage of access rights with an unassigned status). The characteristic may include, for example, a location identifier and/or price characteristic (e.g., value, range or threshold).

At block 1115, a secure token is generated based on or to correspond with an entity associated with the second system, the resource and the resource-access characteristic. In some instances, the secure token includes a set of values (e.g., which may be encoded, converted or encrypted), where a value represents each of the second system, resource and resource-access characteristic. In some instances, the secure token does not include data that itself is informative as to which entity, resource and/or resource-access characteristic it pertains but can nonetheless correspond to such information via (for example) associating the token (e.g., which may be generated using a pseudo-random selection technique and/or application of one or more constraints, such as length specifications or thresholds) with identifiers of the information in a data structure. The secure token may include an alphanumeric code and may be encrypted or otherwise transformed (e.g., using a key and/or transformation technique that is accessible to the second system).

In one instance, the secure token is generated based on or to correspond with the resource-access characteristic by virtue of being generated based on or to correspond with one or more access rights having the characteristic. As one example, each access right for a resource that is associated with the characteristic can be identified and associated with a single or with multiple tokens. As another example, an incomplete subset (e.g., corresponding to a quantity specified in the communication, a single access right or a defined number or percentage) can be identified and associated with a single or multiple tokens.

At block 1120, the secure token is transmitted to the second system. In some instances, a given token is transmitted to only one second system (e.g., and other tokens that may correspond to a same access right and/or resource-access characteristic or to a different access right and/or resource-access characteristic may be transmitted to other second systems). In some instances, a given token is transmitted to multiple systems, the multiple systems including the second system.

At block 1125, the secure token is received from the second system. Receipt of the token may correspond to, for example, an indication that an access right corresponding to the token is to be assigned, a request that a corresponding access right be assigned, and/or a request for a status of a corresponding access right. A communication from the second system that includes the token can also include other information, such as assignment data and/or a commitment to pay a fee for an assignment. For example, assignment data may identify a third device and/or user (e.g., via a username, email address, etc.) that is to be associated with an assignment of a corresponding access right.

At block 1130, the resource and resource-access characteristic are identified. For example, data may be extracted from the token (e.g., by identifying values corresponding to particular positions within the token and/or with particular claim names or fields). As another example, the token (or part of the token) may be used to query a data store for an identifier of each of the resource and the resource-access characteristic. In some instances, a token may need to be transformed prior to or as part of the identification. For example, a received token may be decrypted using a key.

At block 1135, it is determined whether the token corresponds to the second system. For example, data may be extracted from the token (e.g., by identifying a value corresponding to particular positions within the token and/or with a particular claim name or field), and the data may be indicative of a system or entity that was or is to be associated with the token. As another example, the token (or part of the token) may be used to query a data store for an identifier of a system or entity that was or is to be associated with the token. As yet another example, the determination may be made using non-token data, such as an IP address corresponding to a token-inclusive communication or other data in the token-inclusive communication. It may be useful to identify the system, for example, when a return communication is to be sent (e.g., that includes the access code), when assignment-facilitation data is tracked (e.g., to identify the systems facilitating access-right assignment), and/or when payment is to be collected from a the system facilitating access-right assignment.

At block 1140, it is determined whether one or more access rights corresponding to the resource and resource-access characteristic are available. For example, the determination can include determining whether a status of the token indicates that it has not yet been used. As another example, the determination can include identifying one, more or each access right that corresponds to the token and determining whether any of the access rights is available (or have been assigned or are on hold).

When it is determined that no access right corresponding to the token (e.g., to those specifically associated with the token or that match identifications associated with the token, such as a resource and resource-access characteristic) is available, then, at block 1145, a communication may be transmitted to the second system or to a third device (e.g., having been identified in a token-associated communication) that indicates that the token is invalid and/or that no corresponding access right is available.

When it is determined that an access right corresponding to the token (e.g., to those specifically associated with the token or that match identifications associated with the token, such as a resource and resource-access characteristic) is available, then, at block 1150, a communication may be transmitted to the second system or to a third device (e.g., having been identified in a token-associated communication) that identifies an access code corresponding to the access right. For example, if a token is associated with a section 3 for event X, then an access code transmitted at block 1150 may include any seat in section 3 for the event. As another example, if a token is associated with a particular seat for the event, the access code may include the access code for that particular seat. The access code may be transmitted, for example, immediately upon the determination, at a defined time, after detecting that a threshold time prior to a resource-associated time has elapsed, or upon receiving a request (e.g., from the second system or third device) for the code.

It will be appreciated that, while process 1100 depicts an instance where a single access code is transmitted and associated with a token, the process may be extended to relate to multiple access codes per token. For example, a token may be generated based on or to correspond to a quantity of access rights. In instances where a token is not associated with specific access rights, an identification of access rights (e.g., to determined availability and potentially identify access codes) can be performed so as to identify access rights that are associated with contiguous location characteristics.

Specific details are given in the above description to provide a thorough understanding of the embodiments.

However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for token-based generation of access rights to resources, the method comprising:
   receiving, at a first system, a first communication from a second system, the first communication corresponding to a credential of the second system, and the second system corresponding to an entity;
   in response to the receiving, generating, at the first system, a token based on or to correspond with each of the entity and a resource;
   transmitting, from the first system, a second communication to the second system at a first time, the second communication including the token;
   receiving, at the first system, a third communication from the second system, the third communication corresponding to a notification that the token has been transferred to a data requesting system, and the third communication being received at a second time that is after the first time;
   identifying, at the first system, the resource that corresponds to the token based on the received third communication corresponding to the notification;
   in response to identifying the resource that corresponds to the token, generating an access-enabling code for the token, the access-enabling code granting the data requesting system access to the resource during a defined time period;
   receiving, at the first system, a fourth communication from the data requesting system, the fourth communication corresponding to a request for access to the resource and including the token, the fourth communication being received at a third time that is after the second time; and
   determining whether the token corresponds to the access-enabling code, and when the determination indicates that the token corresponds to the access-enabling code, facilitating access to the resource for the data requesting system, the access to the resource for the data requesting system being facilitated using the access-enabling code.

2. The computer-implemented method for token-based generation of access rights to resources, as recited in claim 1, further comprising:
   storing an indication that a status of one or more access-enabling codes provided by a third system are defined as unreliable; and
   inhibiting the third system from providing the one or more access-enabling codes based on the stored indication.

3. The computer-implemented method for token-based generation of access rights to resources, as recited in claim 1, wherein receiving the fourth communication from the data requesting system occurs at a defined spatial area associated with the resource at the second time, wherein the second time is within a threshold time before the defined time period.

4. The computer-implemented method for token-based generation of access rights to resources, as received in claim 1, further comprising:
in response to receiving the fourth communication, determining whether the token corresponds to the access-enabling code, wherein when the token corresponds to the access-enabling code, determining whether the access-enabling code has been previously retrieved in association with the resource.

5. The computer-implemented method for token-based generation of access rights to resources, as received in claim 1, wherein facilitating the access to the resource for the data requesting system comprises:
receiving, at the first system, the token;
determining whether the token corresponds to the access-enabling code; and
in response to determining that the token corresponds to the access-enabling code, transmitting the access-enabling code to the data requesting system, wherein the access-enabling code corresponds to a particular defined portion of the defined spatial area.

6. The computer-implemented method for token-based generation of access rights to resources, as received in claim 1, wherein facilitating the access to the resource for the data requesting system comprises:
receiving, at the first system, the token;
determining whether the token corresponds to the access-enabling code; and
in response to determining that the token corresponds to the access-enabling code, selecting a particular defined portion within the defined spatial area, assigning the particular defined portion to the access-enabling code, and transmitting the access-enabling code to the data requesting system, wherein the access-enabling code corresponds to the particular defined portion of the defined spatial area.

7. The computer-implemented method for token-based generation of access rights to resources, as received in claim 1, further comprising:
storing, at a data store, an indication indicating how one or more access-enabling codes are to be allocated to at least two different channels, each of the two different channels being associated with a particular system that facilitates assignment of the one or more access-enabling codes.

8. A system for token-based generation of access rights to resources, the system comprising:
one or more data processors; and
a non-transitory computer-readable storage medium containing instructions which, when executed on the one or more data processors, cause the one or more data processors to perform operations including:
receiving, at a first system, a first communication from a second system, the first communication corresponding to a credential of the second system, and the second system corresponding to an entity;
in response to the receiving, generating, at the first system, a token based on or to correspond with each of the entity and a resource;
transmitting, from the first system, a second communication to the second system at a first time, the second communication including the token;
receiving, at the first system, a third communication from the second system, the third communication corresponding to a notification that the token has been transferred to a data requesting system, and the third communication being received at a second time that is after the first time;
identifying, at the first system, the resource that corresponds to the token based on the received third communication corresponding to the notification;
in response to identifying the resource that corresponds to the token, generating an access-enabling code for the token, the access-enabling code granting the data requesting system access to the resource during a defined time period;
receiving, at the first system, a fourth communication from the data requesting system, the fourth communication corresponding to a request for access to the resource and including the token, the fourth communication being received at a third time that is after the second time; and
determining whether the token corresponds to the access-enabling code, and when the determination indicates that the token corresponds to the access-enabling code, facilitating access to the resource for the data requesting system, the access to the resource for the data requesting system being facilitated using the access-enabling code.

9. The system for token-based generation of access rights to resources, as recited in claim 8, wherein the operations further comprise:
storing an indication that a status of one or more access-enabling codes provided by a third system are defined as unreliable; and
inhibiting the third system from providing the one or more access-enabling codes based on the stored indication.

10. The system for token-based generation of access rights to resources, as recited in claim 8, wherein receiving the fourth communication from the data requesting system occurs at a defined spatial area associated with the resource at the second time, wherein the second time is within a threshold time before the defined time period.

11. The system for token-based generation of access rights to resources, as recited in claim 8, wherein the operations further comprise:
in response to receiving the fourth communication, determining whether the token corresponds to the access-enabling code, wherein when the token corresponds to the access-enabling code, determining whether the access-enabling code has been previously retrieved in association with the resource.

12. The system for token-based generation of access rights to resources, as recited in claim 8, wherein facilitating the access to the resource for the data requesting system comprises:
receiving, at the first system, the token;
determining whether the token corresponds to the access-enabling code; and
in response to determining that the token corresponds to the access-enabling code, transmitting the access-enabling code to the data requesting system, wherein the access-enabling code corresponds to a particular defined portion of the defined spatial area.

13. The system for token-based generation of access rights to resources, as recited in claim 8, wherein facilitating the access to the resource for the data requesting system comprises:
receiving, at the first system, the token;
determining whether the token corresponds to the access-enabling code; and in response to determining that the token corresponds to the access-enabling code, selecting a particular defined portion within the defined spatial area, assigning the particular defined portion to the access-enabling code, and transmitting the access-enabling code to the data requesting system, wherein the access-enabling code corresponds to the particular defined portion of the defined spatial area.

14. The system for token-based generation of access rights to resources, as recited in claim 8, wherein the operations further comprise:
storing, at a data store, an indication indicating how one or more access-enabling codes are to be allocated to at least two different channels, each of the two different channels being associated with a particular system that facilitates assignment of the one or more access-enabling codes.

15. A computer-program product tangibly embodied in a non-transitory machine-readable storage medium, including instructions configured to cause a data processing apparatus to perform operations including:
receiving, at a first system, a first communication from a second system, the first communication corresponding to a credential of the second system, and the second system corresponding to an entity;
in response to the receiving, generating, at the first system, a token based on or to correspond with each of the entity and a resource;
transmitting, from the first system, a second communication to the second system at a first time, the second communication including the token;
receiving, at the first system, a third communication from the second system, the third communication corresponding to a notification that the token has been transferred to a data requesting system, and the third communication being received at a second time that is after the first time;
identifying, at the first system, the resource that corresponds to the token based on the received third communication corresponding to the notification;
in response to identifying the resource that corresponds to the token, generating an access-enabling code for the token, the access-enabling code granting the data requesting system access to the resource during a defined time period;
receiving, at the first system, a fourth communication from the data requesting system, the fourth communication corresponding to a request for access to the resource and including the token, the fourth communication being received at a third time that is after the second time; and
determining whether the token corresponds to the access-enabling code, and when the determination indicates that the token corresponds to the access-enabling code, facilitating access to the resource for the data requesting system, the access to the resource for the data requesting system being facilitated using the access-enabling code.

16. The computer-program product of claim 15, wherein the operations further comprise:
storing an indication that a status of one or more access-enabling codes provided by a third system are defined as unreliable; and
inhibiting the third system from providing the one or more access-enabling codes based on the stored indication.

17. The computer-program product of claim 15, wherein receiving the fourth communication from the data requesting system occurs at a defined spatial area associated with the resource at the second time, wherein the second time is within a threshold time before the defined time period.

18. The computer-program product of claim 15, wherein the operations further comprise:
in response to receiving the fourth communication, determining whether the token corresponds to the access-enabling code, wherein when the token corresponds to the access-enabling code, determining whether the access-enabling code has been previously retrieved in association with the resource.

19. The computer-program product of claim 15, wherein facilitating the access to the resource for the data requesting system comprises:
receiving, at the first system, the token;
determining whether the token corresponds to the access-enabling code; and
in response to determining that the token corresponds to the access-enabling code, transmitting the access-enabling code to the data requesting system, wherein the access-enabling code corresponds to a particular defined portion of the defined spatial area.

20. The computer-program product of claim 15, wherein facilitating the access to the resource for the data requesting system comprises:
receiving, at the first system, the token;
determining whether the token corresponds to the access-enabling code; and
in response to determining that the token corresponds to the access-enabling code, selecting a particular defined portion within the defined spatial area, assigning the particular defined portion to the access-enabling code, and transmitting the access-enabling code to the data requesting system, wherein the access-enabling code corresponds to the particular defined portion of the defined spatial area.

* * * * *